US011212829B2

(12) United States Patent
Hosseini et al.

(10) Patent No.: US 11,212,829 B2
(45) Date of Patent: Dec. 28, 2021

(54) UPLINK PROCESSING TECHNIQUES FOR REDUCED UPLINK TIMELINES IN WIRELESS COMMUNICATIONS

(71) Applicant: QUALCOMM Incorporated, San Diego, CA (US)

(72) Inventors: Seyedkianoush Hosseini, San Diego, CA (US); Jing Jiang, San Diego, CA (US); Amir Aminzadeh Gohari, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/591,959

(22) Filed: Oct. 3, 2019

(65) Prior Publication Data

US 2020/0112983 A1 Apr. 9, 2020

Related U.S. Application Data

(60) Provisional application No. 62/742,250, filed on Oct. 5, 2018.

(51) Int. Cl.
*H04W 72/14* (2009.01)
*H04W 72/04* (2009.01)
(Continued)

(52) U.S. Cl.
CPC .............. *H04W 72/14* (2013.01); *H04L 1/18* (2013.01); *H04L 5/0055* (2013.01);
(Continued)

(58) Field of Classification Search
CPC ............. H04W 72/14; H04W 72/0446; H04W 72/1268; H04W 76/10; H04L 5/0055;
(Continued)

(56) References Cited

U.S. PATENT DOCUMENTS

| 2018/0020335 A1* | 1/2018 | Yin | ........................ H04L 1/1854 |
| 2018/0020431 A1* | 1/2018 | Cho | ....................... H04W 76/20 |

(Continued)

FOREIGN PATENT DOCUMENTS

WO WO-2017196968 A1 11/2017

OTHER PUBLICATIONS

International Search Report and Written Opinion—PCT/US2019/054708—ISA/EPO—dated Jan. 24, 2020.

*Primary Examiner* — Harry H Kim
(74) *Attorney, Agent, or Firm* — Holland & Hart LLP

(57) ABSTRACT

Methods, systems, and devices for wireless communications are described in which uplink timelines may be reduced by initiating, at a user equipment (UE), uplink transmission processing prior to receipt of an uplink grant for an uplink communication. A UE may identify one or more uplink transmission parameters associated with a reduced uplink transmission timeline for an uplink communication, and use the uplink transmission parameters to initiate processing of the uplink communication prior to receiving an uplink grant from a base station. The uplink transmission parameters may allow for packet preparation at a higher layers (e.g., at a medium access control (MAC) layer or radio link control (RLC) layer) to be started or completed prior to receipt of the uplink grant.

30 Claims, 17 Drawing Sheets

(51) Int. Cl.
*H04W 72/12* (2009.01)
*H04L 5/00* (2006.01)
*H04L 1/18* (2006.01)
*H04W 76/10* (2018.01)
*H04L 27/26* (2006.01)

(52) U.S. Cl.
CPC ... *H04W 72/0446* (2013.01); *H04W 72/1268* (2013.01); *H04L 27/2601* (2013.01); *H04W 76/10* (2018.02)

(58) Field of Classification Search
CPC ....... H04L 1/18; H04L 27/2601; H04L 5/001; H04L 5/0092; H04L 1/1887
See application file for complete search history.

(56) References Cited

U.S. PATENT DOCUMENTS

| | | | |
|---|---|---|---|
| 2018/0124634 A1* | 5/2018 | Jose | H04W 72/1242 |
| 2018/0167916 A1* | 6/2018 | Zhang | H04W 72/042 |
| 2018/0227958 A1* | 8/2018 | Xiong | H04W 74/0833 |
| 2019/0037563 A1* | 1/2019 | Lyu | H04L 5/0053 |
| 2019/0159238 A1* | 5/2019 | Kim | H04L 5/0055 |
| 2019/0306879 A1* | 10/2019 | Seo | H04W 72/12 |
| 2020/0037368 A1* | 1/2020 | Hoglund | H04W 72/14 |
| 2020/0107253 A1* | 4/2020 | Albasheir | H04W 76/10 |
| 2020/0128566 A1* | 4/2020 | Wei | H04W 72/0446 |
| 2020/0196348 A1* | 6/2020 | Fan | H04L 1/08 |
| 2020/0366444 A1* | 11/2020 | Yang | H04W 76/27 |

\* cited by examiner

UPLINK PROCESSING TECHNIQUES FOR REDUCED UPLINK TIMELINES IN WIRELESS COMMUNICATIONS

CROSS REFERENCE

The present application for patent claims the benefit of U.S. Provisional Patent Application No. 62/742,250 by HOSSEINI et al., entitled "UPLINK PROCESSING TECHNIQUES FOR REDUCED UPLINK TIMELINES IN WIRELESS COMMUNICATIONS," filed Oct. 5, 2018, assigned to the assignee hereof, and expressly incorporated by reference herein.

BACKGROUND

The following relates generally to wireless communications, and more specifically to uplink processing techniques for reduced uplink timelines in wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM).

A wireless multiple-access communications system may include a number of base stations or network access nodes, each simultaneously supporting communication for multiple communication devices, which may be otherwise known as user equipment (UE). Some examples of wireless communications systems may perform wireless communications using various data types and/or priorities. As one example of a high priority communication, certain priority transmissions may include communication of data packets that occur within a shorter timeline and at a higher-reliability factor. One non-limiting example of such priority communications may include ultra-reliable, low latency communications (URLLC). But in some cases, a UE may be prevented from achieving low latency for such communications.

SUMMARY

The described techniques relate to improved methods, systems, devices, and apparatuses that support uplink processing techniques for reduced uplink timelines in wireless communications. In some cases, uplink timelines may be reduced by initiating, at a user equipment (UE), uplink transmission processing prior to receipt of an uplink grant for an uplink communication. In some cases, a UE may identify one or more uplink transmission parameters for an uplink communication that are associated with an amount of data to be transmitted in the uplink communication, and use the uplink transmission parameters to initiate processing of the uplink communication prior to receiving an uplink grant from a base station. In some cases, the uplink transmission parameters may allow for packet preparation at a higher layers (e.g., at a medium access control (MAC) layer or radio link control (RLC) layer) to be started or completed prior to receipt of the uplink grant.

In some cases, if the uplink communication is unsuccessfully received at the base station, the base station may provide a feedback communication, such as a negative acknowledgment (NACK) or an uplink retransmission grant, that initiates a retransmission of the uplink communication. In some cases, the uplink timing for the retransmission of the uplink communication may be shorter than uplink timing between the initial uplink grant and the initial uplink communication (e.g., the retransmission may have a smaller N2 value than the initial uplink communication, where N2 is the defined amount of time (e.g., minimum gap, in number of symbols) a UE uses for processing between the end of a physical downlink control channel (PDCCH) scheduling a physical uplink shared channel (PUSCH) and the beginning of the PUSCH. In some cases, the transmission and retransmission of the uplink communication may completed within a predetermined latency budget, such as a one millisecond latency budget for higher priority communications.

A method of wireless communication at a UE is described. The method may include identifying a first uplink transmission parameter associated with a reduced uplink transmission timeline for an uplink communication to a base station, the first uplink transmission parameter associated with an amount of data to be transmitted in the uplink communication, receiving an uplink grant from the base station, and transmitting, responsive to receiving the uplink grant, the uplink communication to the base station according to the reduced uplink transmission timeline.

An apparatus for wireless communication at a UE is described. The apparatus may include a processor, memory in electronic communication with the processor, and instructions stored in the memory. The instructions may be executable by the processor to cause the apparatus to identify a first uplink transmission parameter associated with a reduced uplink transmission timeline for an uplink communication to a base station, the first uplink transmission parameter associated with an amount of data to be transmitted in the uplink communication, receive an uplink grant from the base station, and transmit, responsive to receiving the uplink grant, the uplink communication to the base station according to the reduced uplink transmission timeline.

Another apparatus for wireless communication at a UE is described. The apparatus may include means for identifying a first uplink transmission parameter associated with a reduced uplink transmission timeline for an uplink communication to a base station, the first uplink transmission parameter associated with an amount of data to be transmitted in the uplink communication, receiving an uplink grant from the base station, and transmitting, responsive to receiving the uplink grant, the uplink communication to the base station according to the reduced uplink transmission timeline.

A non-transitory computer-readable medium storing code for wireless communication at a UE is described. The code may include instructions executable by a processor to identify a first uplink transmission parameter associated with a reduced uplink transmission timeline for an uplink communication to a base station, the first uplink transmission parameter associated with an amount of data to be transmitted in the uplink communication, receive an uplink grant from the base station and transmit, responsive to receiving the uplink grant, the uplink communication to the base station according to the reduced uplink transmission timeline.

A method of wireless communication at a UE is described. The method may include identifying a first uplink transmission parameter associated with a reduced uplink transmission timeline for an uplink communication to a base station, the first uplink transmission parameter associated with an amount of data to be transmitted in the uplink communication, initiating, prior to receipt of an uplink grant, preparation of the uplink communication based on the first uplink transmission parameter associated with the reduced uplink transmission timeline, receiving the uplink grant from the base station, and transmitting, responsive to receiving the uplink grant, the uplink communication to the base station.

An apparatus for wireless communication at a UE is described. The apparatus may include a processor, memory in electronic communication with the processor, and instructions stored in the memory. The instructions may be executable by the processor to cause the apparatus to identify a first uplink transmission parameter associated with a reduced uplink transmission timeline for an uplink communication to a base station, the first uplink transmission parameter associated with an amount of data to be transmitted in the uplink communication, initiate, prior to receipt of an uplink grant, preparation of the uplink communication based on the first uplink transmission parameter associated with the reduced uplink transmission timeline, receive the uplink grant from the base station, and transmit, responsive to receiving the uplink grant, the uplink communication to the base station.

Another apparatus for wireless communication at a UE is described. The apparatus may include means for identifying a first uplink transmission parameter associated with a reduced uplink transmission timeline for an uplink communication to a base station, the first uplink transmission parameter associated with an amount of data to be transmitted in the uplink communication, initiating, prior to receipt of an uplink grant, preparation of the uplink communication based on the first uplink transmission parameter associated with the reduced uplink transmission timeline, receiving the uplink grant from the base station, and transmitting, responsive to receiving the uplink grant, the uplink communication to the base station.

A non-transitory computer-readable medium storing code for wireless communication at a UE is described. The code may include instructions executable by a processor to identify a first uplink transmission parameter associated with a reduced uplink transmission timeline for an uplink communication to a base station, the first uplink transmission parameter associated with an amount of data to be transmitted in the uplink communication, initiate, prior to receipt of an uplink grant, preparation of the uplink communication based on the first uplink transmission parameter associated with the reduced uplink transmission timeline, receive the uplink grant from the base station, and transmit, responsive to receiving the uplink grant, the uplink communication to the base station.

Some examples of the method, apparatuses, and non-transitory computer-readable medium described herein may further include operations, features, means, or instructions for receiving a feedback communication from the base station that indicates the uplink communication was unsuccessfully received at the base station, preparing a retransmission of the uplink communication responsive to the NACK feedback, the retransmission of the uplink communication having the first uplink transmission parameter and retransmitting the uplink communication to the base station.

In some examples of the method, apparatuses, and non-transitory computer-readable medium described herein, the transmission and retransmission of the uplink communication may be completed within a predetermined latency budget of 1 millisecond.

In some examples of the method, apparatuses, and non-transitory computer-readable medium described herein, a first time period between receiving the uplink grant and transmitting the uplink communication may be longer than a second time period between receiving the feedback and retransmitting the uplink communication.

In some examples of the method, apparatuses, and non-transitory computer-readable medium described herein, the feedback may be a negative acknowledgment (NACK) feedback or a retransmission grant from the base station.

In some examples of the method, apparatuses, and non-transitory computer-readable medium described herein, the first uplink transmission parameter includes one or more of a transport block size (TB S), a modulation order, a modulation and coding scheme (MCS), a fast Fourier transform (FFT) size, a PUSCH allocation size in terms of number of resource blocks (RBs) or absolute bandwidth, a number of layers, or any combinations thereof.

In some examples of the method, apparatuses, and non-transitory computer-readable medium described herein, the transmission of the uplink communication uses a first FFT size or PUSCH allocation size that may be less than a FFT size or PUSCH allocation size threshold value associated with the reduced uplink transmission timeline.

In some examples of the method, apparatuses, and non-transitory computer-readable medium described herein, the FFT size or PUSCH allocation size threshold may be based on one or more of a capability of the UE or a subcarrier spacing (SCS) associated with the uplink communication.

In some examples of the method, apparatuses, and non-transitory computer-readable medium described herein, the FFT size or PUSCH allocation size threshold may be defined per component carrier or across an uplink allocation across two or more component carriers.

In some examples of the method, apparatuses, and non-transitory computer-readable medium described herein, the FFT size or PUSCH allocation size threshold may be based on a service type associated with the uplink communication or an aggregated allocated bandwidth across two or more logical channels. In such cases, the uplink communication may be associated with one of the two or more logical channels.

In some examples of the method, apparatuses, and non-transitory computer-readable medium described herein, the first uplink transmission parameter may be known a priori at the UE, and packet preparation at one or more of a MAC layer or a RLC layer may be initiated prior to the receiving the uplink grant.

In some examples of the method, apparatuses, and non-transitory computer-readable medium described herein, the transmission of the uplink communication uses a first TBS and the retransmission of the uplink communication uses the first TBS. In such cases, the first TBS may be less than a TBS threshold value associated with the reduced uplink transmission timeline.

In some examples of the method, apparatuses, and non-transitory computer-readable medium described herein, the transmission of the uplink communication uses a first MCS and the retransmission of the uplink communication uses the first MCS.

Some examples of the method, apparatuses, and non-transitory computer-readable medium described herein may further include operations, features, means, or instructions for determining, after receiving the uplink grant, that the uplink grant indicates a second uplink transmission parameter that is different than the first uplink transmission parameter and reinitiating preparation of the uplink communication based on the second uplink transmission parameter. In such cases, transmitting the uplink communication may be based on the second uplink transmission parameter.

Some examples of the method, apparatuses, and non-transitory computer-readable medium described herein may further include operations, features, means, or instructions for determining that the second uplink transmission parameter exceeds a predetermined uplink transmission parameter threshold value.

In some examples of the method, apparatuses, and non-transitory computer-readable medium described herein, the predetermined uplink transmission parameter threshold value may be based on one or more of a capability of the UE, a specified threshold value, a configuration provided by the base station, or a retransmission threshold.

In some examples of the method, apparatuses, and non-transitory computer-readable medium described herein, a first timing between the receiving the uplink grant and transmitting the uplink communication may be reduced based on initiating preparation of the uplink communication relative to a second timing associated with preparing the uplink communication after receiving the uplink grant.

A method of wireless communication at a base station is described. The method may include identifying an uplink transmission parameter associated with a reduced uplink transmission timeline for an uplink communication from a UE to the base station, the uplink transmission parameter associated with an amount of data to be transmitted in the uplink communication, determining an uplink resource allocation for the uplink communication, where a timing associated with the uplink communication is based on the reduced uplink transmission timeline, transmitting an uplink grant to the UE, the uplink grant indicating the uplink resource allocation and the uplink transmission parameter associated with the reduced uplink transmission timeline, and monitoring, responsive to transmitting the uplink grant, for the uplink communication from the UE.

An apparatus for wireless communication at a base station is described. The apparatus may include a processor, memory in electronic communication with the processor, and instructions stored in the memory. The instructions may be executable by the processor to cause the apparatus to identify an uplink transmission parameter associated with a reduced uplink transmission timeline for an uplink communication from a UE to the base station, the uplink transmission parameter associated with an amount of data to be transmitted in the uplink communication, determine an uplink resource allocation for the uplink communication, where a timing associated with the uplink communication is based on the reduced uplink transmission timeline, transmit an uplink grant to the UE, the uplink grant indicating the uplink resource allocation and the uplink transmission parameter associated with the reduced uplink transmission timeline, and monitor, responsive to transmitting the uplink grant, for the uplink communication from the UE.

Another apparatus for wireless communication at a base station is described. The apparatus may include means for identifying an uplink transmission parameter associated with a reduced uplink transmission timeline for an uplink communication from a UE to the base station, the uplink transmission parameter associated with an amount of data to be transmitted in the uplink communication, determining an uplink resource allocation for the uplink communication, where a timing associated with the uplink communication based on the uplink transmission parameter associated with the reduced uplink transmission timeline, transmitting an uplink grant to the UE, the uplink grant indicating the uplink resource allocation and the uplink transmission parameter associated with the reduced uplink transmission timeline, and monitoring, responsive to transmitting the uplink grant, for the uplink communication from the UE.

A non-transitory computer-readable medium storing code for wireless communication at a base station is described. The code may include instructions executable by a processor to identify an uplink transmission parameter associated with a reduced uplink transmission timeline for an uplink communication from a UE to the base station, the uplink transmission parameter associated with an amount of data to be transmitted in the uplink communication, determine an uplink resource allocation for the uplink communication, where a timing associated with the uplink communication is based on the reduced uplink transmission timeline, transmit the uplink grant to the UE, and monitor, responsive to transmitting the uplink grant, for the uplink communication from the UE.

Some examples of the method, apparatuses, and non-transitory computer-readable medium described herein may further include operations, features, means, or instructions for determining, based on the monitoring, that the uplink communication from the UE is not successfully decoded, transmitting a feedback communication to the UE that indicates the uplink communication was unsuccessfully received at the base station and receiving a retransmission of the uplink communication from the UE, where the transmission and retransmission of the uplink communication may be completed within a predetermined latency budget.

In some examples of the method, apparatuses, and non-transitory computer-readable medium described herein, a first time period between transmitting the uplink grant and monitoring for the uplink communication may be longer than a second time period between transmitting the feedback communication and receiving the retransmission the uplink communication.

In some examples of the method, apparatuses, and non-transitory computer-readable medium described herein, the feedback communication may be a NACK feedback or a retransmission grant.

In some examples of the method, apparatuses, and non-transitory computer-readable medium described herein, the uplink transmission parameter includes one or more of a transport block size (TBS), a modulation order, a modulation and coding scheme (MCS), a fast Fourier transform (FFT) size, a PUSCH allocation size in number of resource blocks (RBs) or absolute bandwidth, or any combinations thereof.

In some examples of the method, apparatuses, and non-transitory computer-readable medium described herein, the uplink communication uses a first FFT size that is less than a FFT size threshold value associated with the reduced uplink transmission timeline.

In some examples of the method, apparatuses, and non-transitory computer-readable medium described herein, the FFT size or PUSCH allocation size threshold may be based on one or more of a capability of the UE or a SCS associated with the uplink communication.

In some examples of the method, apparatuses, and non-transitory computer-readable medium described herein, the FFT size or PUSCH allocation size threshold may be defined per component carrier or across an uplink allocation across two or more component carriers.

In some examples of the method, apparatuses, and non-transitory computer-readable medium described herein, the FFT size or PUSCH allocation size threshold may be based on a service type associated with the uplink communication or an aggregated allocated bandwidth across two or more logical channels. In such cases, the uplink communication may be associated with one of the two or more logical channels.

In some examples of the method, apparatuses, and non-transitory computer-readable medium described herein, the uplink communication uses a first TBS and a retransmission of the uplink communication uses the first TBS. In such cases, the first TBS may be less than a TBS threshold value associated with the reduced uplink transmission timeline.

In some examples of the method, apparatuses, and non-transitory computer-readable medium described herein, the uplink communication uses a first MCS, and a retransmission of the uplink communication uses the first MCS.

In some examples of the method, apparatuses, and non-transitory computer-readable medium described herein, the uplink transmission parameter threshold may be based on one or more of a capability of the UE, a specified threshold value, a configuration provided to the UE by the base station, or a retransmission threshold.

DETAILED DESCRIPTION

Figure 1:
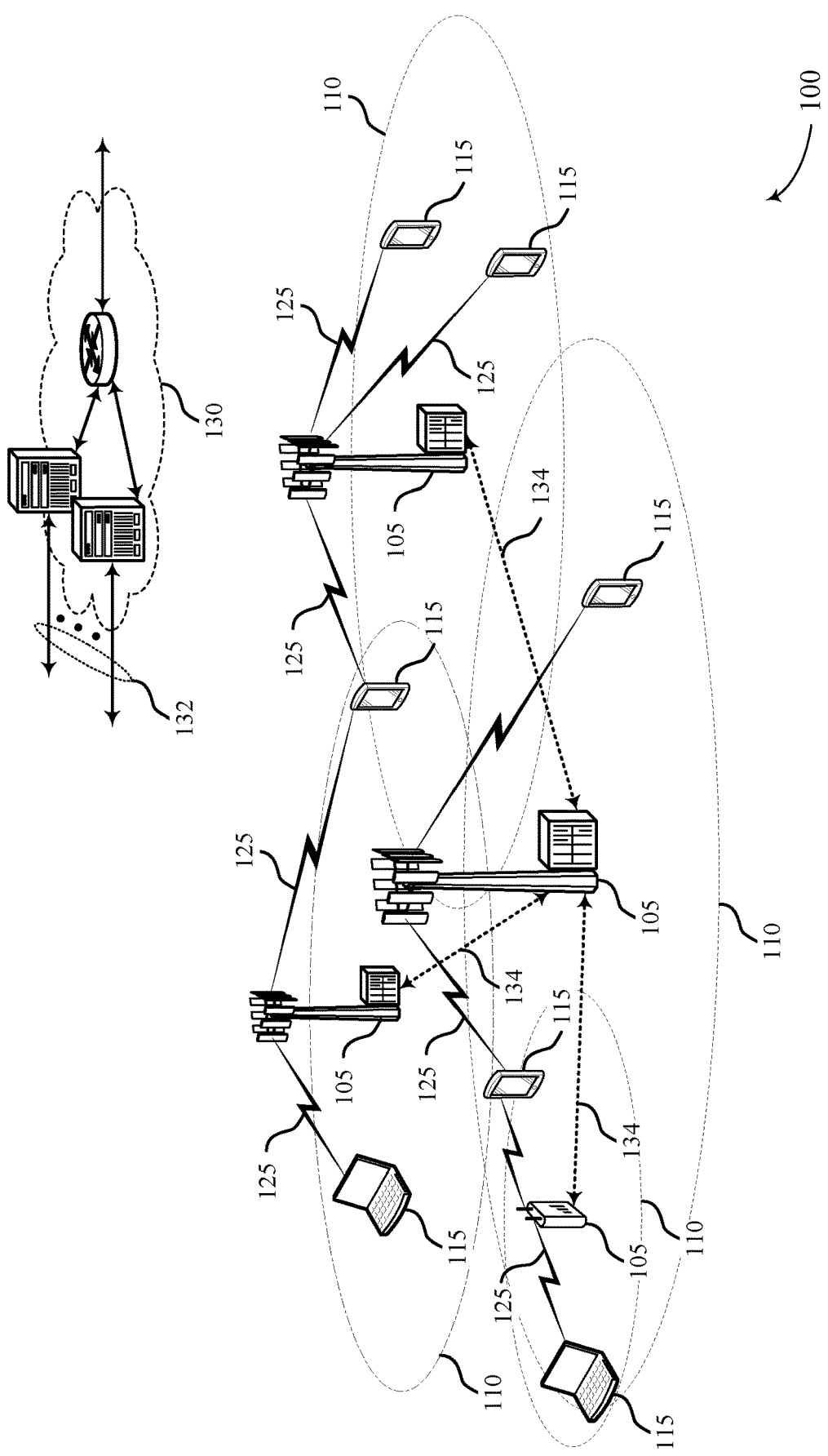
FIG. 1 illustrates an example of a system for wireless communications in accordance with aspects of the present disclosure.

Various aspects of the present disclosure provide techniques for reduced uplink timelines in wireless communications. As discussed herein, some examples of wireless communications systems may perform wireless communications using various data types, priorities, or combinations thereof, in which some higher priority transmissions may include communication of data packets that occur within a shorter timeline and at a higher-reliability factor. One non-limiting example of higher priority communications may include ultra-reliable, low latency communications (URLLC), and one non-limiting example of a lower priority communications may include enhanced mobile broadband (eMBB) communications. To accommodate requirements (e.g., reliability and latency) of both lower and higher priority communications (e.g., eMBB and URLLC), in some cases the higher priority communications may be prioritized over the lower priority communications and may have shorter timelines for transmissions. In some cases, wireless communications systems may support preempting the lower priority communications to support the higher priority communications.

Although a user equipment (UE) may have pending uplink data with a low latency requirement (e.g., URLLC data), a conventional UE may be prevented from satisfying the latency requirement due to the UE's uplink transmission timeline. The uplink transmission timeline (or "uplink timeline") may refer to the length of time in between receipt of an uplink grant at the UE and transmission of data in accordance with the uplink grant. The uplink transmission timeline of a UE may be a function of processing overhead at the UE. For example, after receiving an uplink grant a UE may perform various processes at various layers to prepare data packets for uplink transmission. The preparation processes may depend on uplink transmission parameters indicated by the uplink grant, and because the processes take time, transmission by the UE may be delayed until the processes are completed. Thus, packet preparation processes may impact the uplink timeline of a UE. Packet preparation processes may also be referred to as uplink transmission processing, which may include other aspects of uplink preparation.

According to the techniques described herein, uplink transmission timelines may be reduced by initiating, at a UE, uplink transmission processing prior to receipt of an uplink grant for an uplink communication. In some cases, a UE may identify one or more uplink transmission parameters for an uplink communication that are associated with an amount of data to be transmitted in the uplink communication, and use the uplink transmission parameters to initiate processing of the uplink communication prior to receiving an uplink grant from a base station. In some cases, the uplink transmission parameters may allow for packet preparation at a higher layers (e.g., at a medium access control (MAC) layer or radio link control (RLC) layer) to be started or completed prior to receipt of the uplink grant. In some cases, the uplink transmission parameters may include one or more of a transport block size (TBS), a modulation order, a modulation and coding scheme (MCS), a fast Fourier transform (FFT) size, or a physical uplink shared channel (PUSCH) allocation size.

In some cases, if the uplink communication is unsuccessfully received at the base station, the base station may provide a feedback communication, such as a negative acknowledgment (NACK) or an uplink retransmission grant, that initiates a retransmission of the uplink communication. In some cases, the uplink timing for the retransmission of the uplink communication may be shorter than uplink timing between the initial uplink grant and the initial uplink communication (e.g., the retransmission may have a smaller N2 value than the initial uplink communication). In some cases, the transmission and retransmission of the uplink communication may completed within a predetermined latency budget, such as a one millisecond latency budget for higher priority communications.

In some cases, the one or more uplink transmission parameters (e.g., TBS, FFT, PUSCH allocation, etc.) may be configured at the UE by a base station, and the UE may initiate processing of the uplink communication based on a periodicity for the uplink communications. For example, in some cases URLLC transmissions may occur at a known periodicity (e.g., for communications of sensor measurements of a device), and the amount of data transmitted in each transmission may be relatively small (e.g., 32 bytes). Thus, the base station may configure such uplink transmissions based on an assumption that a certain amount of data will be transmitted. In some cases, the base station may allocate an uplink grant to the UE that contains a different value for one or more of the uplink transmission parameters than the UE assumed for the uplink communication. In such cases, the uplink timeline may be extended and the UE may reinitiate uplink processing based on transmission parameters indicated by the uplink grant.

Techniques such as discussed herein may thus allow for reduced uplink timelines for uplink communications from a UE to a base station. Such reduced uplink timelines may provide for lower latency in some higher priority communications, which can enhance system performance and reliability. Such techniques may also, in some cases, allow for more efficient use of processing resources at a UE, which may help reduce UE power consumption.

Aspects of the disclosure are initially described in the context of a wireless communications system. Aspects of the disclosure are further illustrated by and described with reference to apparatus diagrams, system diagrams, and flowcharts that relate to uplink processing techniques for reduced uplink timelines in wireless communications.

FIG. 1 illustrates an example of a wireless communications system in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices. In some cases, UEs 115 and base stations 105 may communication using reduced timelines associated with higher priority communications (e.g., for URLLC traffic).

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, a UE 115 may receive an uplink grant for data pending at the UE 115. The uplink grant may include uplink transmission parameters that the UE 115 is to use for the uplink transmission. For example, the uplink grant may indicate, among other parameters, the transport block (TB) size (TBS), the fast Fourier transform (FFT) size, the modulation order, the modulation and coding scheme (MCS), and/or the PUSCH size the UE 115 is to use for the transmission. Accordingly, the UE 115 may prepare the uplink packets for transmission based on the uplink parameters indicated in the uplink. But waiting for the uplink transmission parameters before starting uplink transmission processing may increase the uplink transmission timeline (e.g., the latency between receiving an uplink grant and performing the corresponding uplink transmission), which may decrease system efficiency and waste resources at the UE.

According to the techniques described herein, uplink transmission timelines for communications from a UE 115 to a base station 105 may be reduced by initiating, at a UE 115, uplink transmission processing prior to receipt of an uplink grant for an uplink communication. In some cases, the uplink transmission processing may be based one or more uplink transmission parameters that are associated with an amount of data to be transmitted in the uplink communication. In some cases, the uplink transmission parameters may allow for packet preparation at a higher layers (e.g., MAC/RLC processing) to be started or completed prior to receipt of the uplink grant.

Figure 2:
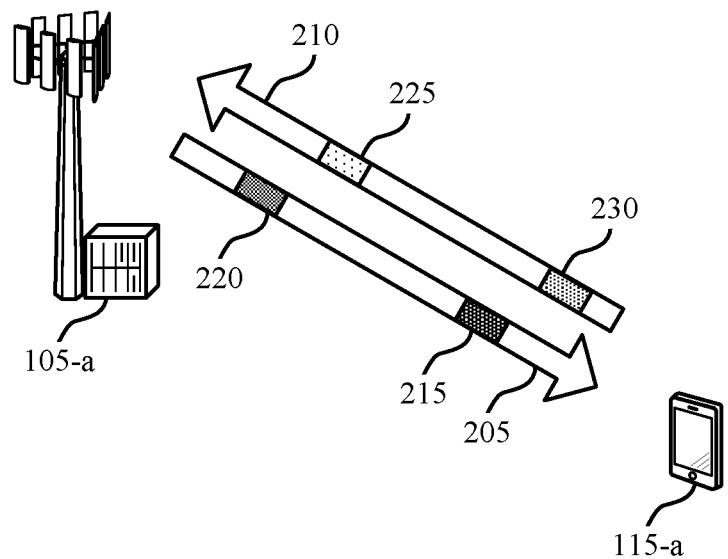
FIG. 2 illustrates an example of a wireless communications system in accordance with aspects of the present disclosure.
Figure 2:
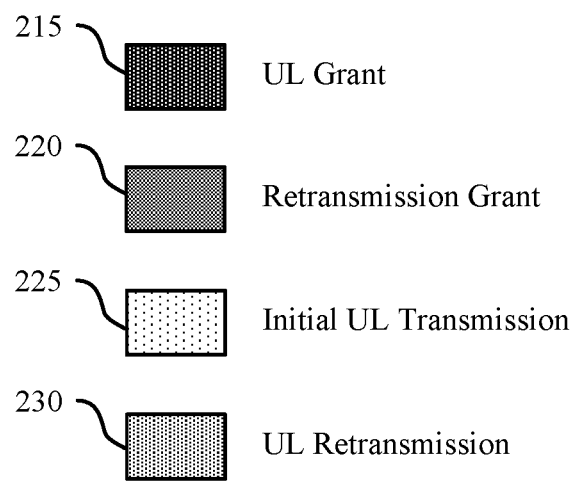

FIG. 2 illustrates an example of a wireless communications in accordance with aspects of the present disclosure. The wireless communications system 200 may include a base station 105-a and a UE 115-a, which may be examples of the corresponding devices described with reference to FIG. 1. The wireless communications system 200 may also implement aspects of the wireless communications system 100. For example, the base station 105-a and UE 115-a may support reduced timelines for certain higher priority uplink transmissions that may, for example, support low latency communications (e.g., URLLC).

In the example of FIG. 2, the base station 105-a and UE 115-a may communicate via downlink communications 205 and uplink communications 210 which may be established via a bidirectional communications link, for example. In some cases, the base station 105-a may transmit an uplink grant 215 and the UE 115-a, responsive to the uplink grant 215, may transmit an initial uplink transmission 225. In some cases, the base station 105-a may not successfully receive the initial uplink transmission 225, and may transmit a feedback communication (e.g., a HARQ ACK/NACK indication) to the UE 115-a to indicate that the initial uplink transmission 225 was not successfully received. In some cases, the base station 105-a may transmit a retransmission grant 220 that may indicate resources for an uplink retransmission 230 from the UE 115-a. In some cases, the retransmission grant 220 may indicate a NACK to the UE 115-a and indicate uplink resources for the uplink retransmission 230.

In some cases, higher priority communications (e.g., for a URLLC service) may have a latency budget that is relatively stringent. For example, a latency budget of 1 ms may be provided for the initial uplink transmission 225 and the uplink retransmission 230. The latency budget in such cases then includes an uplink processing timeline for the initial uplink transmission 225, as well as an uplink processing timeline for the uplink retransmission 230. In some cases, wireless communications system 200 may support multiple sets of uplink processing timelines. For example, PUSCH preparation timing values may indicate a number of OFDM symbols for PUSCH preparation (which may be referred to as N2 values) defined in NR specifications, which include PUSCH preparation timing for capability 1 and 2 UEs. Thus, an N2 value may refer to a defined amount of time (e.g., number of symbols) a UE uses for processing between the PDCCH that schedules data and the PUSCH in which the data is scheduled. For example, the N2 value may be the processing time used by the UE between the end of the PDCCH scheduling a PUSCH and the beginning of the scheduled PUSCH. In some cases uplink processing timelines may be dependent on subcarrier spacing (SCS) used for the uplink communications. As indicated above, it is desirable to reduce the processing timeline, such as for uplink URLLC traffic, to ensure that two HARQ-based transmissions within the latency budget (e.g., 1 ms) can be completed.

According to various aspects of the present disclosure, it is expected that many higher priority transmissions may be associated with relatively small packet sizes (e.g., small TBS), which may allow the processing timeline to be reduced to some extent. However, there are some procedures for which the required time is independent of the TBS. For example, the size of MAC headers is independent of the data packet size, and RLC segmentation may be needed if the uplink grant 215 is smaller than the packet size. Further, logical channel priority comparison may be needed if the UE 115-a does not know that the channel, at the PHY layer, is for high priority traffic (e.g., for URLLC). Such processing traditionally may occur upon receipt of the uplink grant 215. Aspects of the present disclosure provide for reduction in these uplink timelines based on one or more transmission parameters that are known a priori at the UE 115-a, which may allow for more substantial amounts of uplink transmission processing to be performed in advance of the UE 115-a receiving the uplink grant 215.

In some examples, the uplink transmission timeline may be reduced based on a TB size, modulation order, MCS, or any combinations thereof, being known a priori by the UE 115-a. In such cases, packet preparation at a higher layers (e.g., MAC/RLC processing) may be started or completed even before the uplink grant 215 is received and decoded at the UE 115-a. For example, for some deployments (e.g., in an industrial internet of things (IIOT) deployment), the TB size may be fixed (e.g., to a size of 32 bytes). In such cases, the UE 115-a may process the initial uplink transmission 225 based on the fixed TB size, which may reduce the uplink timeline (e.g., may allow for a smaller N2 value for PUSCH preparation timing). Further, for retransmissions of a TB, the TBS may be the same as the initial transmission TBS.

Such techniques may also provide that for the retransmission of a HARQ-process, the timeline can be smaller than that of the initial transmission (e.g., the N2 value for the retransmission may be smaller than the N2 value for the initial transmission). For example, a UE 115-a may determine and use a first N2 value for an initial transmission of data. The first N2 value may represent the uplink transmission timeline in terms of a first number symbols between the PDCCH that schedules a PUSCH and the scheduled PUSCH. The UE 115-a may also determine a second N2 value for a retransmission of the data. The second N2 value may represent a reduced uplink transmission timeline that has a second number of symbols less than the first number of symbols. The UE 115-a may use the reduced uplink transmission timeline for the retransmission automatically or when it receives an uplink transmission parameter that is associated with the reduced uplink transmission timeline. Thus, the latency for a retransmission may be reduced compared to the latency of the initial transmission. Although described with reference to a transmission associated with a HARQ process, a UE 115-a that receives the uplink parameter associated with the reduced uplink transmission timeline may use the reduced uplink transmission timeline for any type of transmission.

Additionally or alternatively, a dynamic UE 115-a behavior may be defined in which the UE 115-a uses a shorter processing timeline if the uplink grant 215 indicates a TBS of size X, where X is known at the UE 115-a a priori. When the indicated TBS is consistent with size X, the UE 115-a may leverage uplink transmission processing that was performed prior to receipt of the uplink grant 215, thereby reducing processing overhead and delay. If the uplink grant 215 indicates a TBS other than size X, a longer processing timeline may be assumed (e.g., because the UE 115-a may re-process certain aspects of the uplink transmission based on the actual TBS, rather than TBS of size X). The value of X may be known at both the UE 115-a and the base station 105-a. In some cases, X could be use case specific and fixed. In other cases X could be signaled to the UE 115-a by higher layer signaling (e.g., via RRC signaling), or could be associated with the retransmission. Although described with reference to TBS, the dynamic behavior of UE 115-a may be implemented using any of the uplink transmission parameters described herein.

In some cases, additionally or alternatively, uplink processing timelines may also be reduced by setting a FFT size or PUSCH allocation size for the initial uplink transmission 225 and the uplink retransmission 230. The PUSCH allocation size may represent the size of the allocated resource in either the number of RBs, or in absolute bandwidth, for example, 20 MHz. If the FFT size (or PUSCH allocation size) is above a threshold, the UE may not follow the very fast timeline and may use a slower timeline. If the FFT size (or PUSCH allocation size) is below a threshold, then the UE 115-a may follow the faster timeline. In some cases, the threshold may be based on a UE capability or fixed in a specification. Further, the threshold could be SCS dependent, and defined per CC or across the allocations on all CCs. In some cases, the threshold value may be service-type dependent or dependent upon an aggregated allocated bandwidth regardless of the service type (e.g., the threshold may be set on the URLLC PUSCH, or could be set on all granted uplink channels). In some cases, the service types may be distinguished by different DCI formats, an indication in the DCI, a radio network temporary identifier (RNTI) of PDCCH, a PDCCH search space or CORESETs, bandwidth parts (BWPs) for PDCCH monitoring, or any combinations thereof.

Figure 3:
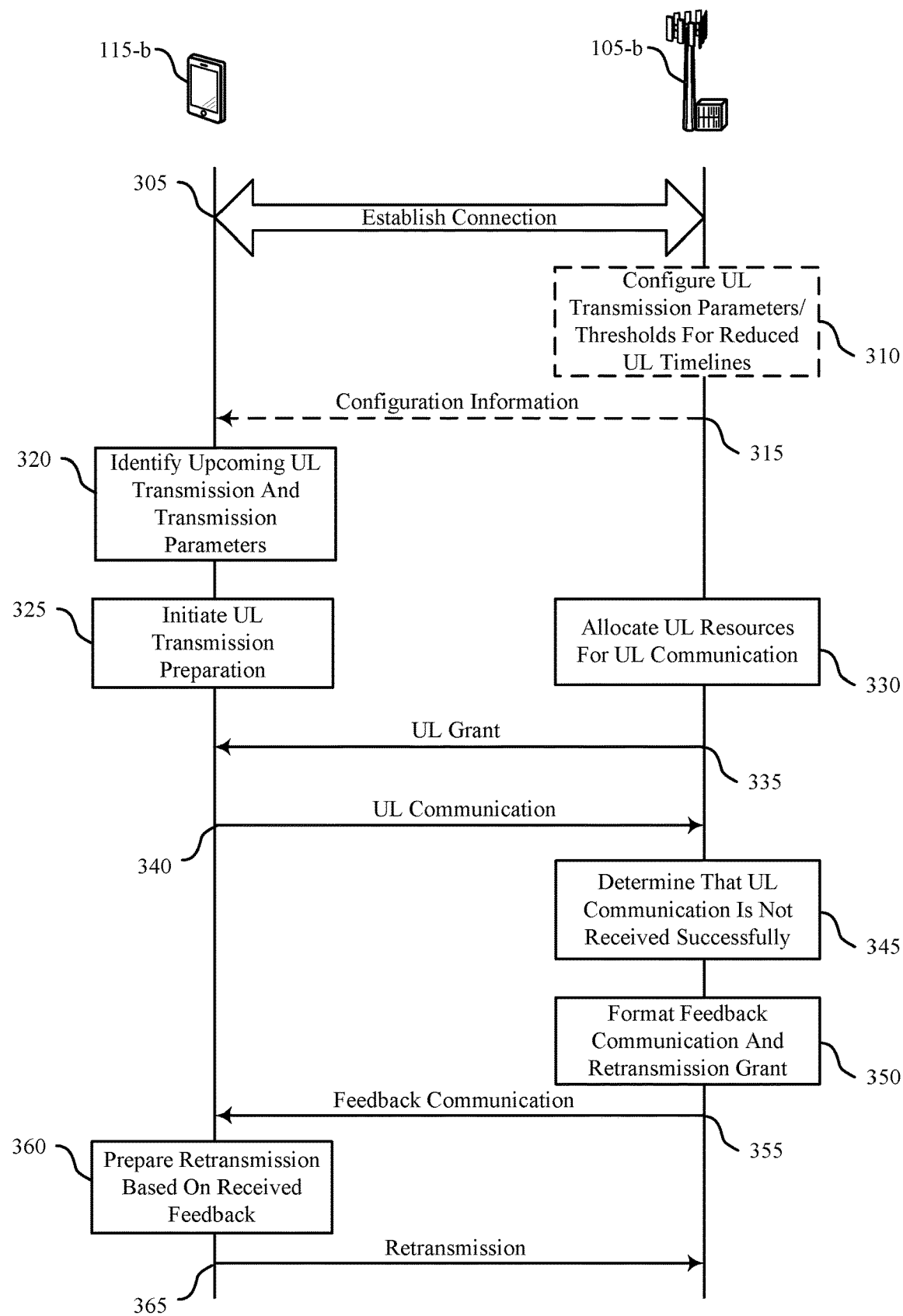
FIGS. 3 and 4 illustrate examples of process flows in accordance with aspects of the present disclosure.

FIG. 3 illustrates an example of a process flow 300 in accordance with aspects of the present disclosure. The process flow 300 may include a base station 105-b and a UE 115-b, which may be examples of the corresponding devices described with reference to FIGS. 1 and 2. In some examples, the process flow 300 may implement aspects of the wireless communications system 100 and 200. For example, the base station 105-*b* or the UE 115-*b*, or both may support reduced uplink timelines for high priority communications.

In the following description of the process flow 300, the operations between the base station 105-*b* and the UE 115-*b* may be transmitted in a different order than the exemplary order shown, or the operations performed by the base station 105-*b* and the UE 115-*b* may be performed in different orders or at different times. Certain operations may also be left out of the process flow 300, or other operations may be added to the process flow 300.

In some examples, the process flow 300 may commence at 305 with the base station 105-*b* establishing a connection with the UE 115-*b* (e.g., performing a cell acquisition procedure, a random access procedure, an RRC connection procedure, an RRC configuration procedure, etc.).

At 310, the base station 105-*b* may optionally configure uplink transmission parameters or transmission parameter thresholds that are associated with, and allow for, reduced uplink timelines. For example, the base station 105-*b* may configure one or more of a TBS, a modulation order, a MCS, a FFT size, a PUSCH allocation size in terms of a number of resource blocks (RBs) or absolute bandwidth (e.g., 20 kHz), a number of spatial layers (e.g., a larger number of layers may have a larger Ns and a smaller number of layers may have a smaller N2 value for PUSCH preparation timing), or any combination thereof, that the UE 115-*b* may then use for processing an uplink communication prior to receiving an uplink grant. The base station 105-*b* may transmit the configuration information 315 to the UE 115-*b* in such cases (e.g., via RRC signaling). In some cases, the configuration information 315 may be provided to the UE 115-*b* as part of the connection establishment procedure at 305. In some cases, the configuration information 315 may be based at least in part on a capability of the UE 115-*b*, which may be reported to the base station 105-*b* as part of the connection establishment procedure at 305.

At 320, the UE 115-*b* may identify an upcoming uplink transmission and the configured uplink transmission parameters. In some cases, the UE 115-*b* may transmit uplink communications on a relatively consistent basis, such as according to a schedule for reporting information that is measured at the UE 115-*a* (e.g., in an IIoT deployment or in an autonomous vehicle deployment), and the UE 115-*b* may identify data to be transmitted in accordance with such reporting. In some cases, the uplink transmission parameters may be identified based on higher layer signaling, or the uplink transmission parameters may be preconfigured at the UE 115-*b*. In some examples (e.g., when the upcoming uplink transmission is a retransmission), the uplink transmission parameters may be identified based on a preceding transmission (e.g., based on the uplink transmission parameters used for the original transmission).

At 325, the UE 115-*b* may initiate uplink transmission preparation. In some cases, the identified uplink transmission parameters may be used to perform processing (e.g., MAC/RLC processing) prior to receiving an uplink grant. The UE 115-*b* may, in such cases, assume one or more transmission parameters will be used for the uplink transmission, and perform uplink processing accordingly.

At 330, the base station 105-*b* may allocate uplink resources for the uplink communications of the UE 115-*b*. In some cases, the base station 105-*b* may determine an uplink resource allocation and one or more uplink transmission parameters, where the uplink transmission parameters may be selected in accordance with the configured uplink transmission parameters for high priority communications, for example. The base station 105-*b* may transmit an uplink grant 335 to the UE 115-*b* that indicates the allocated uplink resources and the uplink transmission parameters.

The UE 115-*b* may receive the uplink grant, and transmit uplink communication 340 to the base station 105-*b*. In some cases, because the UE 115-*b* had performed uplink processing prior to receiving the uplink grant 335, the UE 115-*b* may transmit the uplink communication 340 relatively quickly, such as within an identified number of symbols (e.g., within a value of N2 symbols) that may be fewer symbols than would be needed if the UE 115-*b* had performed more of the uplink processing after receipt of the uplink grant 335.

In cases where the base station 105-*b* receives the uplink communication 340 successfully, an ACK may be provided to the UE 115-*b*. In the example of FIG. 3, however, the base station 105-*b* may not successfully receive the uplink communication 340. In such a case, at 345, the base station 105-*b* may determine that the uplink communication is not received successfully. Such a determination may be made, for example, based on unsuccessful decoding at the base station 105-*b*. In some cases the base station 105-*b* may store received signals of the uplink communication 340 in a soft buffer that may be combined with a retransmission to enhance the likelihood of successful reception after retransmission.

At 350, the base station 105-*b* may format a feedback communication and a retransmission grant. In some cases, the feedback communication may include a HARQ-NACK, and may indicate an uplink transmission resource that is to be used for a retransmission. The base station 105-*b* may transmit the feedback communication 355 to the UE 115-*b*.

At 360, the UE 115-*b* may receive the feedback communication 355 and prepare a retransmission of the uplink communication based on the received feedback. In some cases, one or more uplink parameters of the initial uplink communication 340 may be used for the retransmission, and the UE 115-*b* may transmit the retransmission 365 to the base station 105-*b*. In some cases, an uplink processing timeline for the retransmission may be shorter than the uplink processing timeline for the initial uplink communication 340 (e.g., a value of N2 for the retransmission may be lower than a value of N2 for the initial transmission). Such a shorter uplink processing timeline may help to meet the latency budget for the communications.

Figure 4:
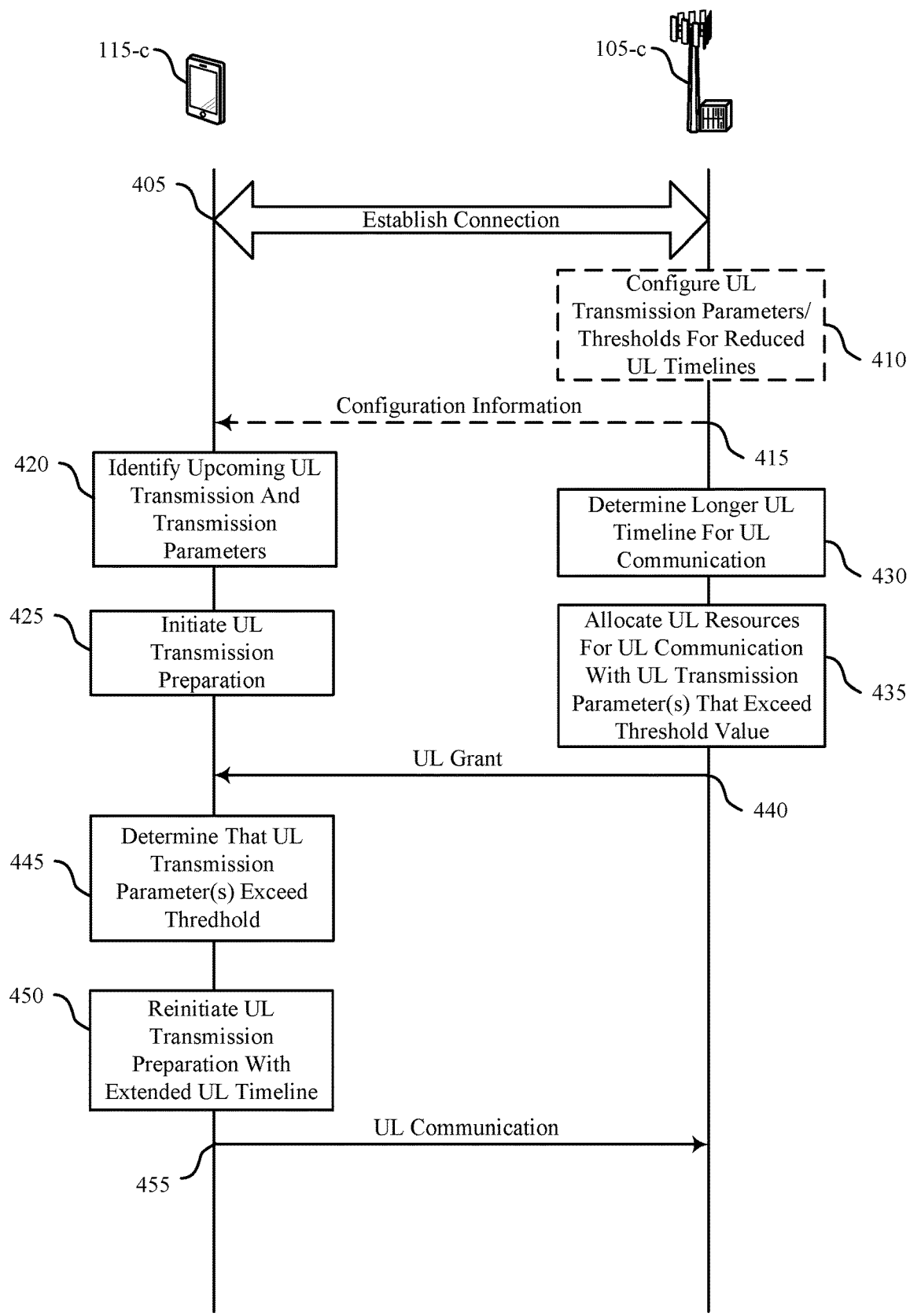

FIG. 4 illustrates an example of a process flow 400 in accordance with aspects of the present disclosure. The process flow 400 may include a base station 105-*c* and a UE 115-*c*, which may be examples of the corresponding devices described with reference to FIGS. 1 and 2. In some examples, the process flow 400 may implement aspects of the wireless communications system 100 and 200. For example, the base station 105-*c* or the UE 115-*c*, or both may support reduced uplink timelines for high priority communications.

In the following description of the process flow 400, the operations between the base station 105-*c* and the UE 115-*c* may be transmitted in a different order than the exemplary order shown, or the operations performed by the base station 105-*c* and the UE 115-*c* may be performed in different orders or at different times. Certain operations may also be left out of the process flow 400, or other operations may be added to the process flow 400.

In some examples, the process flow 400 may commence at 405 with the base station 105-*c* establishing a connection with the UE 115-*c* (e.g., performing a cell acquisition procedure, a random access procedure, an RRC connection procedure, an RRC configuration procedure, etc.).

At 410, the base station 105-*c* may optionally configure uplink transmission parameters or transmission parameter thresholds that allow for reduced uplink timelines. For example, the base station 105-*c* may configure one or more of a TBS, a modulation order, a MCS, a FFT size, a PUSCH allocation size either the number of RBs or in absolute bandwidth, a number of layers, or any combination thereof, that the UE 115-*c* may then use for processing an uplink communication prior to receiving an uplink grant. The base station 105-*c* may transmit the configuration information 415 to the UE 115-*c* in such cases (e.g., via RRC signaling). In some cases, the configuration information 415 may be provided to the UE 115-*c* as part of the connection establishment procedure at 405. In some cases, the configuration information 415 may be based at least in part on a capability of the UE 115-*c*, which may be reported to the base station 105-*c* as part of the connection establishment procedure at 405. In some cases, threshold values may be provided that are associated with the uplink transmission parameters, and the UE 115-*c* may perform uplink processing assuming that the associated uplink transmission parameters will be at or below the threshold values.

At 420, the UE 115-*c* may identify an upcoming uplink transmission and the configured uplink transmission parameters. In some cases, the UE 115-*c* may transmit uplink communications on a relatively consistent basis, such as according to a schedule for reporting information that is measured at the UE 115-*a* (e.g., in an IIoT deployment or in an autonomous vehicle deployment), and the UE 115-*c* may identify data to be transmitted in accordance with such reporting.

At 425, the UE 115-*c* may initiate uplink transmission preparation. In some cases, the identified uplink transmission parameters may be used to perform processing (e.g., MAC/RLC processing) prior to receiving an uplink grant. The UE 115-*c* may, in such cases, assume one or more transmission parameters will be used for the uplink transmission, and perform uplink processing accordingly.

At 430, the base station 105-*c* may determine that a longer uplink processing timeline is to be used for the uplink communication. In some cases, such a determination may be made based on scheduling constraints at the base station 105-*c*, for example. In other cases, such a determination may be made based on one or more channel conditions that may have changed since the uplink transmission parameters were configured, and the base station 105-*c* may determine that the longer timeline may provide a higher likelihood of successful transmissions.

At 435, the base station 105-*c* may allocate uplink resources for the uplink communications of the UE 115-*c*, in which one or more transmission parameters may exceed an associated threshold value. The base station 105-*c* may transmit an uplink grant 440 to the UE 115-*c* that indicates the allocated uplink resources and the uplink transmission parameters.

At 445, the UE 115-*c* may receive the uplink grant, and determine that one or more uplink transmission parameters of the grant exceed a threshold value associated with the identified uplink transmission parameters that were previously identified and used for initiating uplink transmission preparation at 425.

At 450, the UE 115-*c* may reinitiate the uplink transmission preparation with an extended uplink timeline. In some cases, the UE 115-*c* may discard prior processing that was performed, and may start uplink processing over based on the uplink transmission parameters provided in the uplink grant 440. As indicated, such processing may result in longer uplink timelines. The UE 115-*a* may then transmit uplink communication 455 to the base station 105-*c*.

Figure 5:
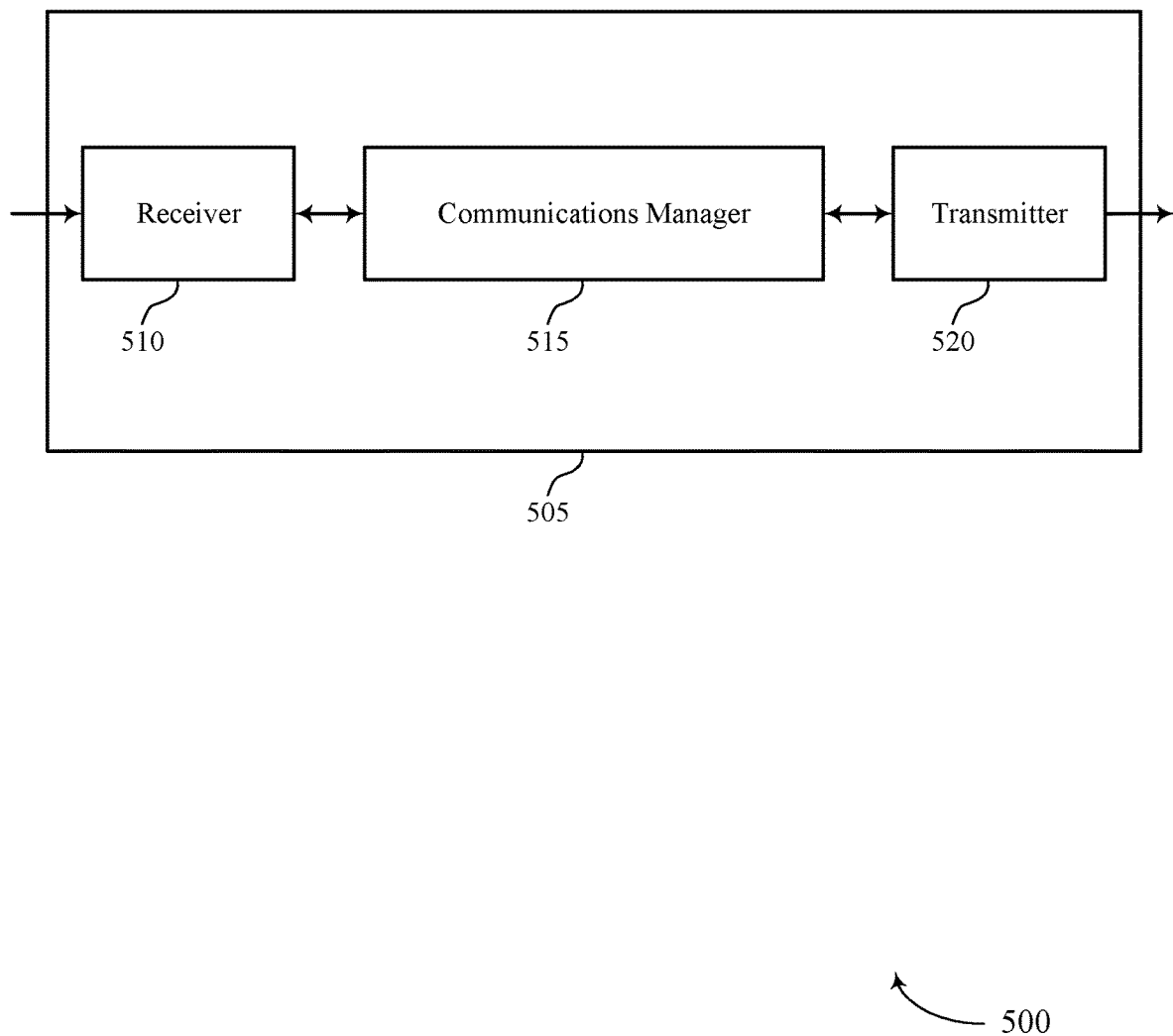
FIGS. 5 and 6 show block diagrams of devices in accordance with aspects of the present disclosure.

FIG. 5 shows a block diagram 500 of a device 505 in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to uplink processing techniques for reduced uplink timelines in wireless communications, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may identify a first uplink transmission parameter associated with a reduced uplink transmission timeline for an uplink communication to a base station, the first uplink transmission parameter associated with an amount of data to be transmitted in the uplink communication, receive an uplink grant from the base station, and transmit, responsive to receiving the uplink grant, the uplink communication to the base station according to the reduced uplink transmission timeline.

The communications manager 515 may identify a first uplink transmission parameter associated with a reduced uplink transmission timeline for an uplink communication to a base station, the first uplink transmission parameter associated with an amount of data to be transmitted in the uplink communication, initiate, prior to receipt of an uplink grant, preparation of the uplink communication based on the first uplink transmission parameter associated with the reduced uplink transmission timeline, receive the uplink grant from the base station, and transmit, responsive to receiving the uplink grant, the uplink communication to the base station. The communications manager 515 may be an example of aspects of the communications manager 810 described herein.

The communications manager 515 as described herein may be implemented to realize one or more potential advantages. For example, by identifying the first uplink transmission parameter prior to receipt of the uplink grant, the device 505 may commence uplink transmission processing based on the uplink transmission parameter without waiting to receive the uplink transmission parameter in the uplink grant. Thus, certain aspects of the uplink communication may be prepared prior to receipt of the uplink grant, which may reduce the uplink transmission timeline of the device 505. Reduction of the uplink transmission timeline may allow the device 505 to conserve power resources (e.g., by going to sleep quicker) or free up processing resources after receipt of the uplink grant that would otherwise be used for preparation purposes.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
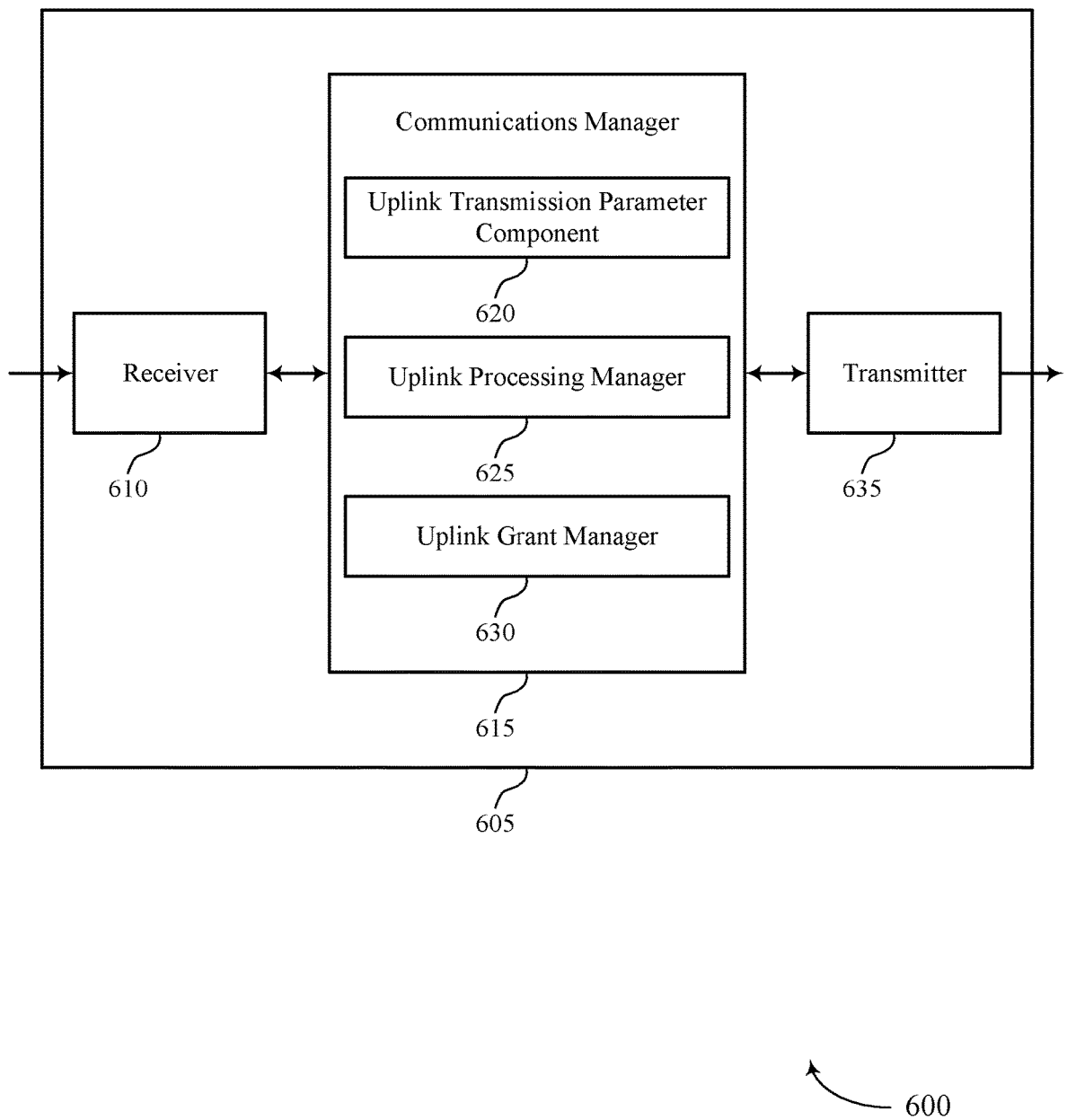

FIG. 6 shows a block diagram 600 of a device 605 in accordance with aspects of the present disclosure. The device 605 may be an example of aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to uplink processing techniques for reduced uplink timelines in wireless communications, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include an uplink transmission parameter component 620, an uplink processing manager 625, and an uplink grant manager 630. The communications manager 615 may be an example of aspects of the communications manager 810 described herein.

The uplink transmission parameter component 620 may identify a first uplink transmission parameter associated with a reduced uplink transmission timeline for an uplink communication to a base station. The first uplink transmission parameter may be associated with an amount of data to be transmitted in the uplink communication.

The uplink processing manager 625 may initiate, prior to receipt of an uplink grant, preparation of the uplink communication based on the first uplink transmission parameter. In some cases, at least a portion of the uplink communication may be prepared prior to the receipt of the uplink grant.

The uplink grant manager 630 may receive the uplink grant from the base station and transmit, responsive to receiving the uplink grant, the uplink communication to the base station according to the reduced uplink transmission timeline.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
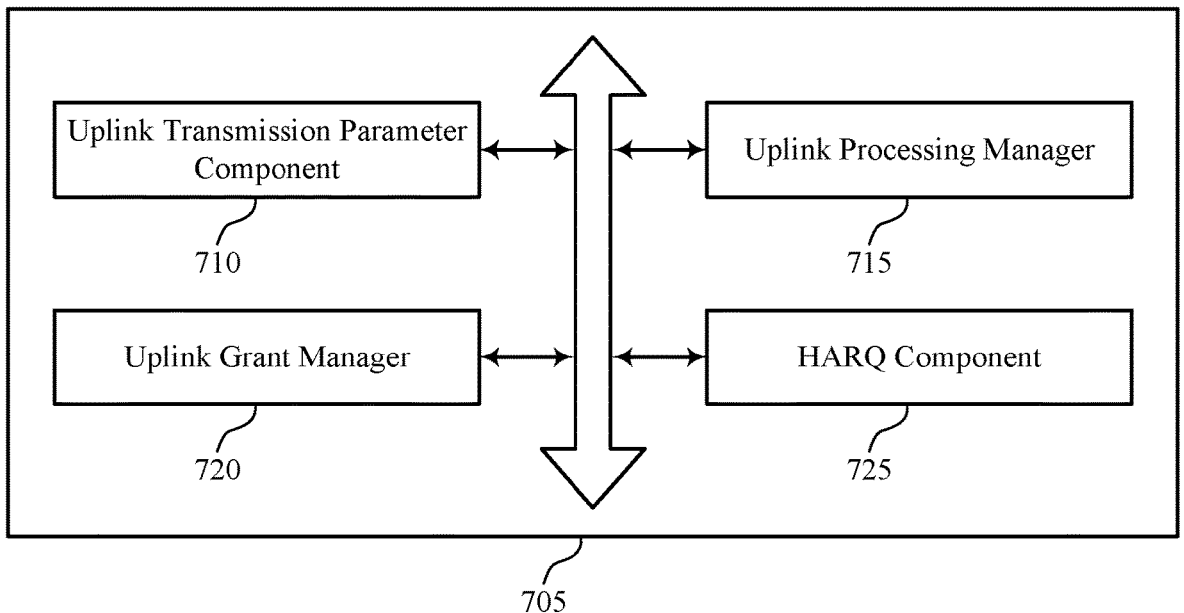
FIG. 7 shows a block diagram of a communications manager in accordance with aspects of the present disclosure.

FIG. 7 shows a block diagram 700 of a communications manager 705 that supports uplink processing techniques for reduced uplink timelines in wireless communications in accordance with aspects of the present disclosure. The communications manager 705 may be an example of aspects of a communications manager 515, a communications manager 615, or a communications manager 810 described herein. The communications manager 705 may include an uplink transmission parameter component 710, an uplink processing manager 715, an uplink grant manager 720, and a HARQ component 725. Each of these modules may communicate, directly or indirectly, with one another (e.g., via one or more buses).

The uplink transmission parameter component 710 may identify a first uplink transmission parameter associated with a reduced uplink transmission timeline for an uplink communication to a base station, the first uplink transmission parameter associated with an amount of data to be transmitted in the uplink communication. In some examples, the uplink transmission parameter component 710 may determine, after receiving the uplink grant, that the uplink grant indicates a second uplink transmission parameter that is different than the first uplink transmission parameter. In some examples, the uplink transmission parameter component 710 may determine that the second uplink transmission parameter exceeds a predetermined uplink transmission parameter threshold value.

In some cases, the first uplink transmission parameter includes one or more of a TBS, a modulation order, a MCS, a FFT size, a PUSCH allocation size in either the number of RBs or in absolute bandwidth, a number of layers, or any combinations thereof. By identifying the first uplink transmission parameter, the UE may perform aspects of uplink transmission processing (such as RLC segmentation, MAC header preparation, etc.) for the uplink communication prior to receipt of the uplink grant for the communication. Thus, the UE may reduce the latency of communications between the UE and a base station, which in turn may improve the quality of the user experience. Additionally, the reduced uplink timeline may allow the UE to conserve power (e.g., by going to sleep sooner after receipt of an uplink grant compared to longer uplink timelines). If the uplink grant conflicts with the first uplink transmission parameter (e.g., indicates a different size, value, order, etc.), the UE may use a non-reduced uplink transmission timeline.

In some cases, the transmission of the uplink communication uses a first FFT size or PUSCH allocation size that is less than a FFT size or PUSCH allocation size threshold value associated with a reduced uplink transmission timeline. In some cases, the FFT size or PUSCH allocation size threshold is based on one or more of a capability of the UE or a SCS associated with the uplink communication. In some cases, the FFT size or PUSCH allocation size threshold is defined per component carrier or across an uplink allocation across two or more component carriers. In some cases, the FFT size or PUSCH allocation size threshold is based on a service type associated with the uplink communication or an aggregated allocated bandwidth across two or more logical channels, and where the uplink communication is associated with one of the two or more logical channels.

In some cases, the transmission of the uplink communication uses a first TBS, and the retransmission of the uplink communication uses the first TBS. The first TBS may be less than a TBS threshold value associated with a reduced uplink transmission timeline. In some cases, the transmission of the uplink communication uses a first MCS, and the retransmission of the uplink communication uses the first MCS. In some cases, the predetermined uplink transmission parameter threshold value is based on one or more of a capability of the UE, a specified threshold value, a configuration provided by the base station, or a retransmission threshold.

The uplink processing manager 715 may initiate, prior to receipt of an uplink grant, preparation of the uplink communication based on the first uplink transmission parameter. In some cases, at least a portion of the uplink communication is prepared prior to the receipt of the uplink grant. In some examples, the uplink processing manager 715 may prepare a retransmission of the uplink communication responsive to the NACK feedback and the retransmission of the uplink communication may have the first uplink transmission parameter. In some examples, the uplink processing manager 715 may reinitiate the preparing the uplink communication based on the second uplink transmission parameter.

In some cases, the first uplink transmission parameter is known a priori at the UE, and packet preparation at one or more of a MAC layer or a RLC layer is initiated prior to the receiving the uplink grant. In some cases, a first timing between the receiving the uplink grant and transmitting the uplink communication is reduced based on the initiating the preparing the uplink communication relative to a second timing associated with the preparing the uplink communication after receiving the uplink grant.

The uplink grant manager 720 may receive the uplink grant from the base station. In some examples, the uplink grant manager 720 may transmit, responsive to receiving the uplink grant, the uplink communication to the base station. In some examples, the uplink grant manager 720 may retransmit the uplink communication to the base station. In some cases, the transmission and retransmission of the uplink communication are completed within a predetermined latency budget of 1 millisecond. In some cases, a first time period between receiving the uplink grant and transmitting the uplink communication is longer than a second time period between receiving the feedback and retransmitting the uplink communication.

The HARQ component 725 may receive a feedback communication from the base station that indicates the uplink communication was unsuccessfully received at the base station. In some cases, the feedback is NACK feedback or a retransmission grant from the base station.

Figure 8:
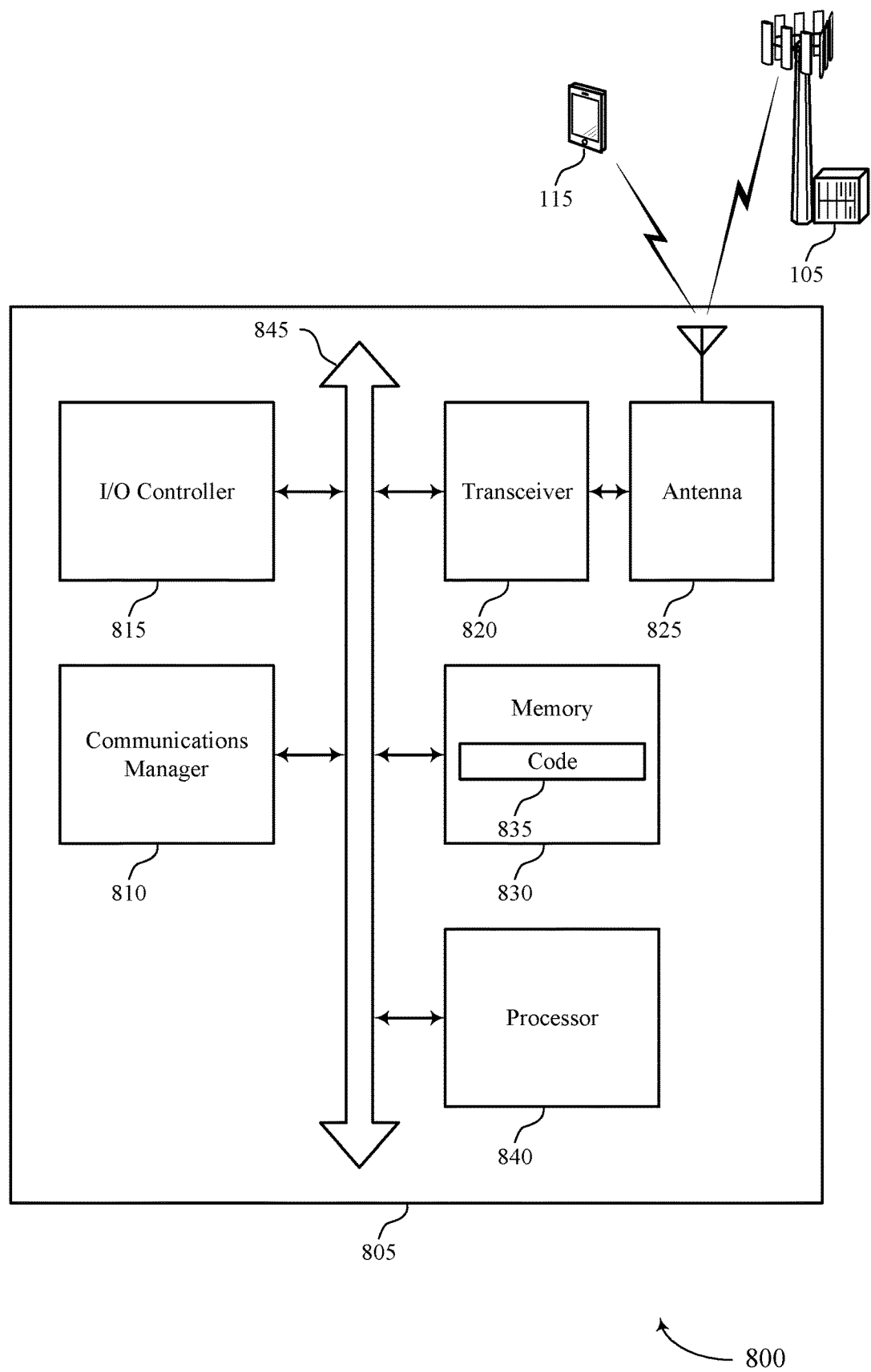
FIG. 8 shows a diagram of a system including a device in accordance with aspects of the present disclosure.

FIG. 8 shows a diagram of a system 800 including a device 805 in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may identify a first uplink transmission parameter associated with a reduced uplink transmission timeline for an uplink communication to a base station, the first uplink transmission parameter associated with an amount of data to be transmitted in the uplink communication. The communications manager 810 may receive an uplink grant from the base station, and transmit, responsive to receiving the uplink grant, the uplink communication to the base station according to the reduced uplink transmission timeline.

The communications manager 810 may identify a first uplink transmission parameter associated with a reduced uplink transmission timeline for an uplink communication to a base station, the first uplink transmission parameter associated with an amount of data to be transmitted in the uplink communication, initiate, prior to receipt of an uplink grant, preparation of the uplink communication based on the first uplink transmission parameter associated with the reduced uplink transmission timeline. In some cases, at least a portion of the uplink communication is prepared prior to the receipt of the uplink grant. The communications manager 810 may receive the uplink grant from the base station, and transmit, responsive to receiving the uplink grant, the uplink communication to the base station.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting uplink processing techniques for reduced uplink timelines in wireless communications).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
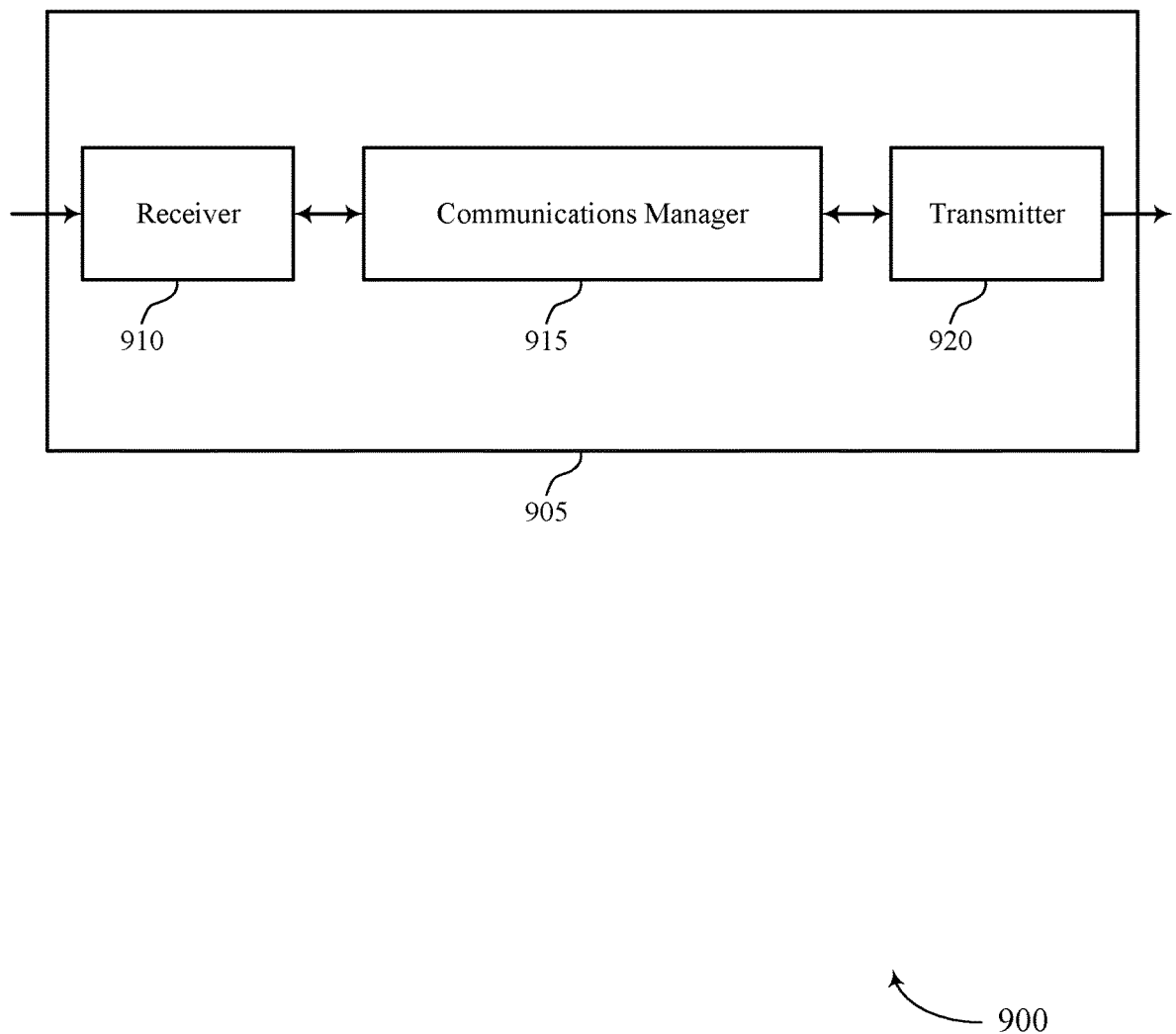
FIGS. 9 and 10 show block diagrams of devices in accordance with aspects of the present disclosure.

FIG. 9 shows a block diagram 900 of a device 905 in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to uplink processing techniques for reduced uplink timelines in wireless communications, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may identify an uplink transmission parameter associated with a reduced uplink transmission timeline for an uplink communication from a UE to the base station, the uplink transmission parameter associated with an amount of data to be transmitted in the uplink communication, determine an uplink resource allocation for the uplink communication, where a timing associated with the uplink communication is based on the reduced uplink transmission timeline, transmit an uplink grant to the UE, the uplink grant indicating the uplink resource allocation and the uplink transmission parameter associated with the reduced uplink transmission timeline, and monitor, responsive to transmitting the uplink grant, for the uplink communication from the UE. The communications manager 915 may be an example of aspects of the communications manager 1210 described herein.

The communications manager 915 as described herein may be implemented to realize one or more potential advantages. For example, by identifying the uplink transmission parameter associated with a reduced uplink transmission timeline, the device 905 may enable the UE to use uplink transmission processing performed prior to receipt of the uplink grant. Thus, the device 905 may reduce the latency of the uplink transmission, which may increase system efficiency, improve user experience, and reduce resource consumption at the UE.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
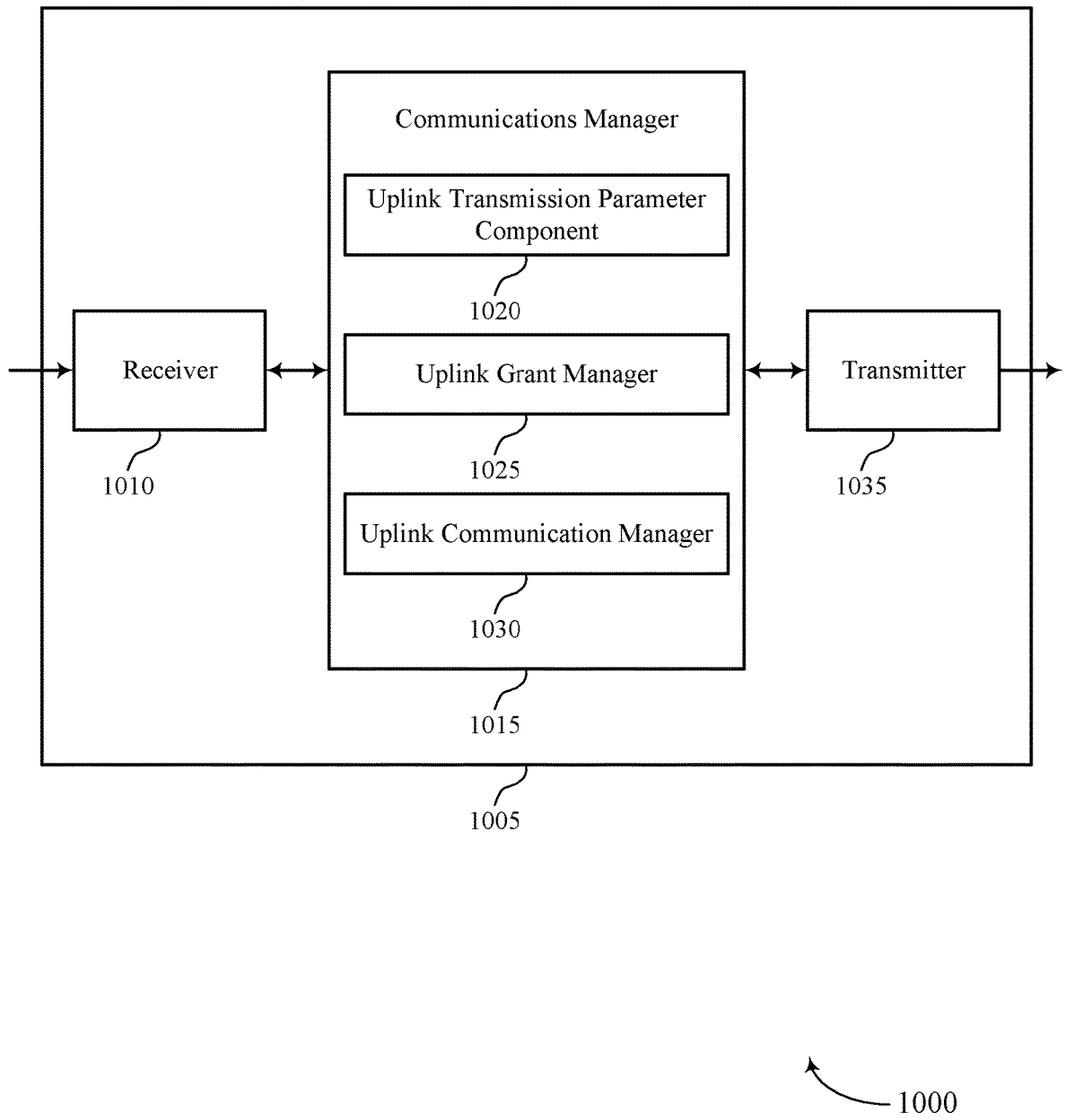

FIG. 10 shows a block diagram 1000 of a device 1005 in accordance with aspects of the present disclosure. The device 1005 may be an example of aspects of a device 905, or a base station 105 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to uplink processing techniques for reduced uplink timelines in wireless communications, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include an uplink transmission parameter component 1020, an uplink grant manager 1025, and an uplink communication manager 1030. The communications manager 1015 may be an example of aspects of the communications manager 1210 described herein.

The uplink transmission parameter component 1020 may identify an uplink transmission parameter associated with a reduced uplink transmission timeline for an uplink communication from a UE to the base station, the uplink transmission parameter associated with an amount of data to be transmitted in the uplink communication.

The uplink grant manager 1025 may determine an uplink resource allocation for the uplink communication, where the uplink resource allocation includes the uplink transmission parameter, where a timing associated with the uplink communication is based on the uplink transmission parameter associated with the reduced uplink transmission timeline.

The uplink communication manager 1030 may monitor, responsive to transmitting the uplink grant, for the uplink communication from the UE.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
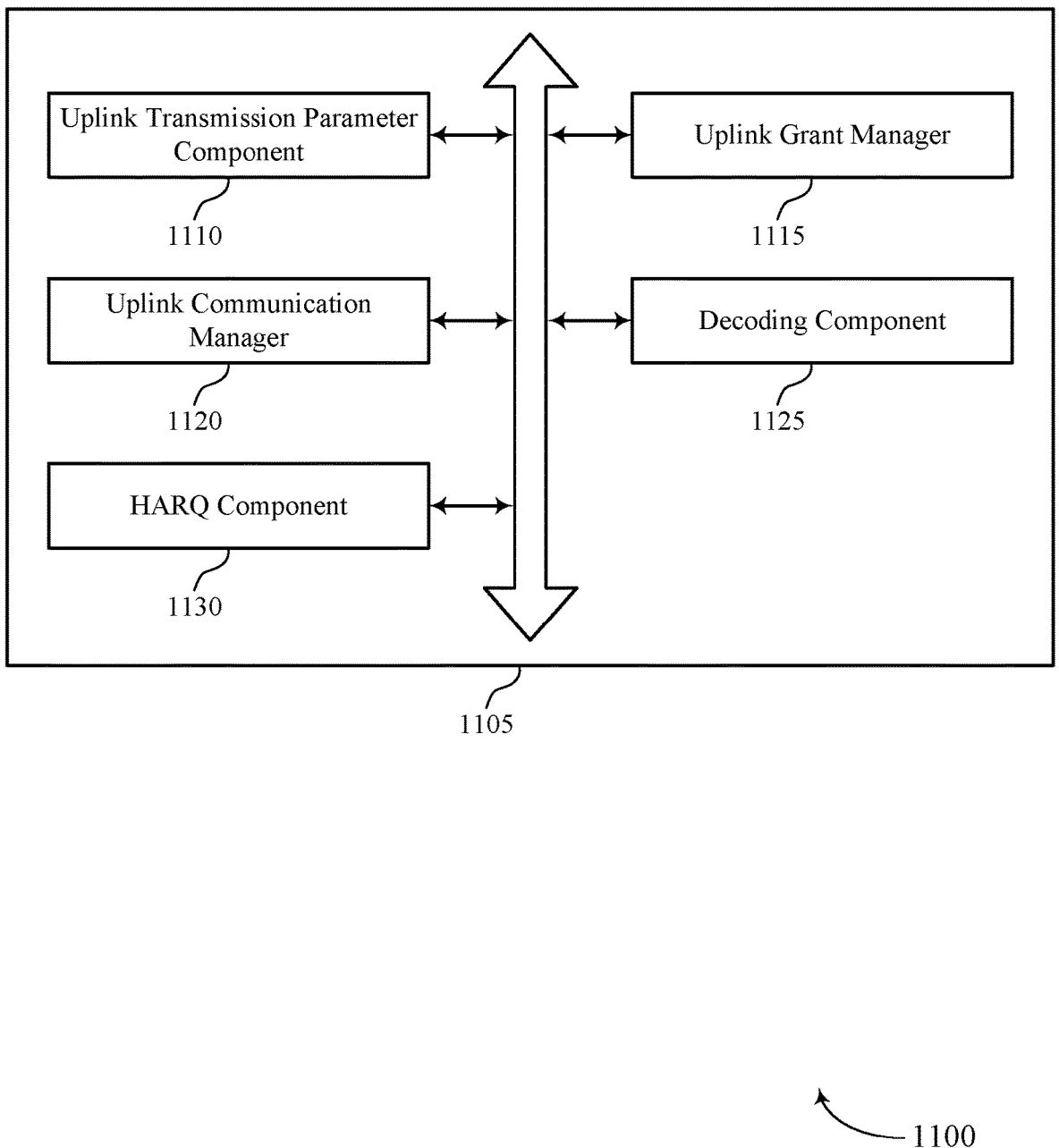
FIG. 11 shows a block diagram of a communications manager in accordance with aspects of the present disclosure.

FIG. 11 shows a block diagram 1100 of a communications manager 1105 in accordance with aspects of the present disclosure. The communications manager 1105 may be an example of aspects of a communications manager 915, a communications manager 1015, or a communications manager 1210 described herein. The communications manager 1105 may include an uplink transmission parameter component 1110, an uplink grant manager 1115, an uplink communication manager 1120, a decoding component 1125, and a HARQ component 1130. Each of these modules may communicate, directly or indirectly, with one another (e.g., via one or more buses).

The uplink transmission parameter component 1110 may identify an uplink transmission parameter associated with a reduced uplink transmission timeline for an uplink communication from a UE to the base station, the uplink transmission parameter associated with an amount of data to be transmitted in the uplink communication. In some cases, the uplink transmission parameter includes one or more of a TBS, a modulation order, a MCS, a FFT size, a PUSCH allocation size in terms of number of RBs or absolute bandwidth (e.g., 20 kHz), a number of layers, or any combinations thereof. In some cases, the uplink communication uses a first FFT size or PUSCH allocation size that is less than a FFT size or PUSCH allocation size threshold value associated with the reduced uplink transmission timeline. In some cases, the FFT size or PUSCH allocation size threshold is based on one or more of a capability of the UE or a SCS associated with the uplink communication. In some cases, the FFT size or PUSCH allocation size threshold is defined per component carrier or across an uplink allocation across two or more component carriers. In some cases, the FFT size or PUSCH allocation size threshold is based on a service type associated with the uplink communication or an aggregated allocated bandwidth across two or more logical channels, and where the uplink communication is associated with one of the two or more logical channels.

In some cases, the uplink communication uses a first TBS, and a retransmission of the uplink communication uses the first TBS, and where the first TBS is less than a TBS threshold value associated with the reduced uplink transmission timeline. In some cases, the uplink communication uses a first MCS, and a retransmission of the uplink communication uses the first MCS. In some cases, the uplink transmission parameter threshold is based on one or more of a capability of the UE, a specified threshold value, a configuration provided to the UE by the base station, or a retransmission threshold.

The uplink grant manager 1115 may determine an uplink resource allocation for the uplink communication, where a timing associated with the uplink communication is based on the reduce uplink transmission timeline. In some examples, the uplink grant manager 1115 may transmit an uplink grant to the UE. The uplink grant may indicate the uplink resource allocation and the uplink transmission parameter associated with the reduced uplink transmission timeline. In some cases, a first time period between transmitting the uplink grant and monitoring for the uplink communication is longer than a second time period between transmitting the feedback communication and receiving the retransmission the uplink communication.

The uplink communication manager 1120 may monitor, responsive to transmitting the uplink grant, for the uplink communication from the UE. In some examples, the uplink communication manager 1120 may receive a retransmission of the uplink communication from the UE, where the transmission and retransmission of the uplink communication are completed within a predetermined latency budget.

The decoding component 1125 may determine, based on the monitoring, that the uplink communication from the UE is not successfully decoded.

The HARQ component 1130 may transmit a feedback communication to the UE that indicates the uplink communication was unsuccessfully received at the base station. In some cases, the feedback communication is a HARQ-NACK feedback or a retransmission grant.

Figure 12:
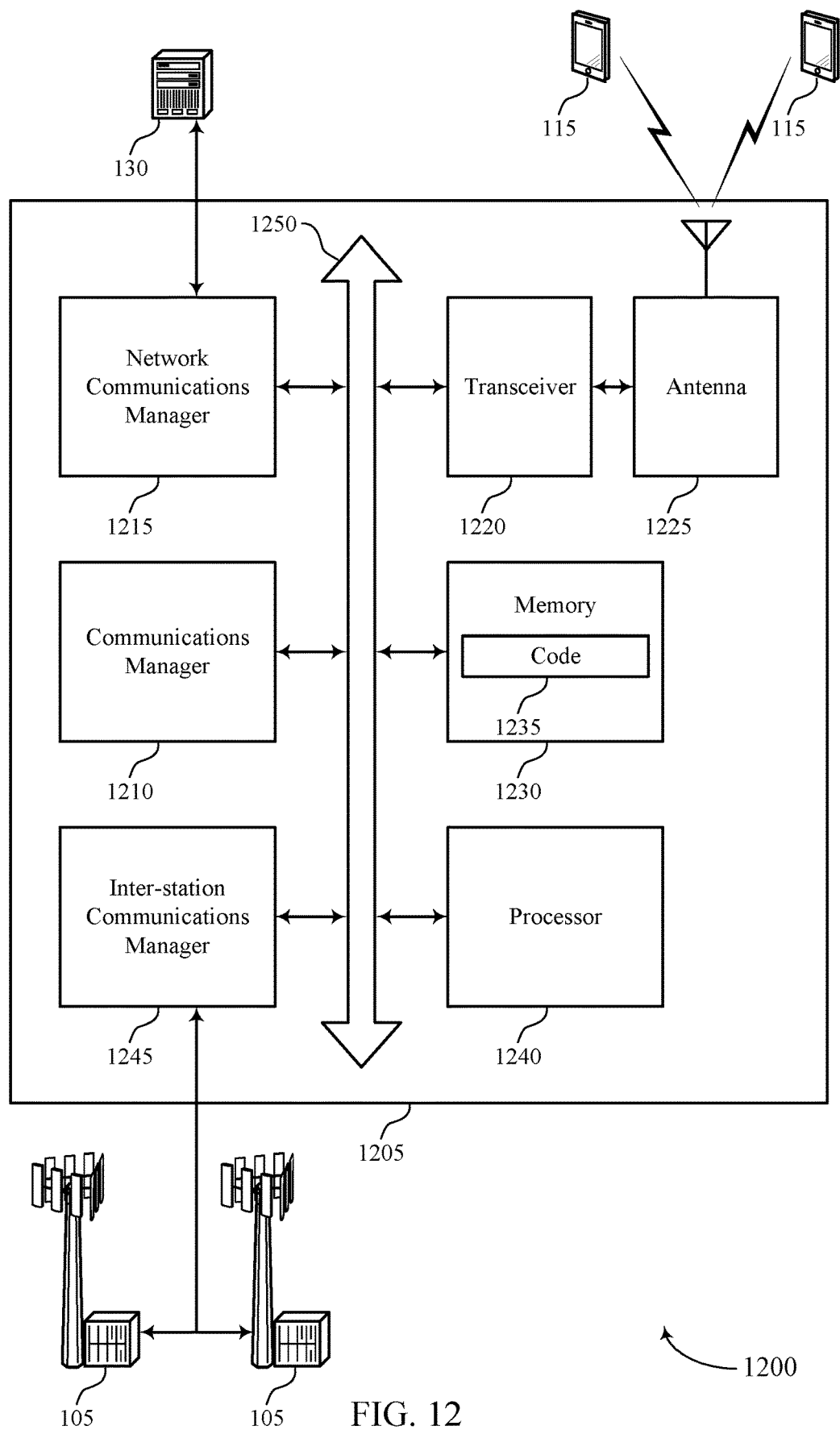
FIG. 12 shows a diagram of a system including a device in accordance with aspects of the present disclosure.

FIG. 12 shows a diagram of a system 1200 including a device 1205 in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may identify an uplink transmission parameter associated with a reduced uplink transmission timeline for an uplink communication from a UE to the base station, the uplink transmission parameter associated with an amount of data to be transmitted in the uplink communication, determine an uplink resource allocation for the uplink communication, where a timing associated with the uplink communication is based on the reduced uplink transmission timeline, transmit an uplink grant to the UE, the uplink grant indicating the uplink resource allocation and the uplink transmission parameter associated with the reduced uplink transmission timeline, and monitor, responsive to transmitting the uplink grant, for the uplink communication from the UE.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described herein For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting uplink processing techniques for reduced uplink timelines in wireless communications).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
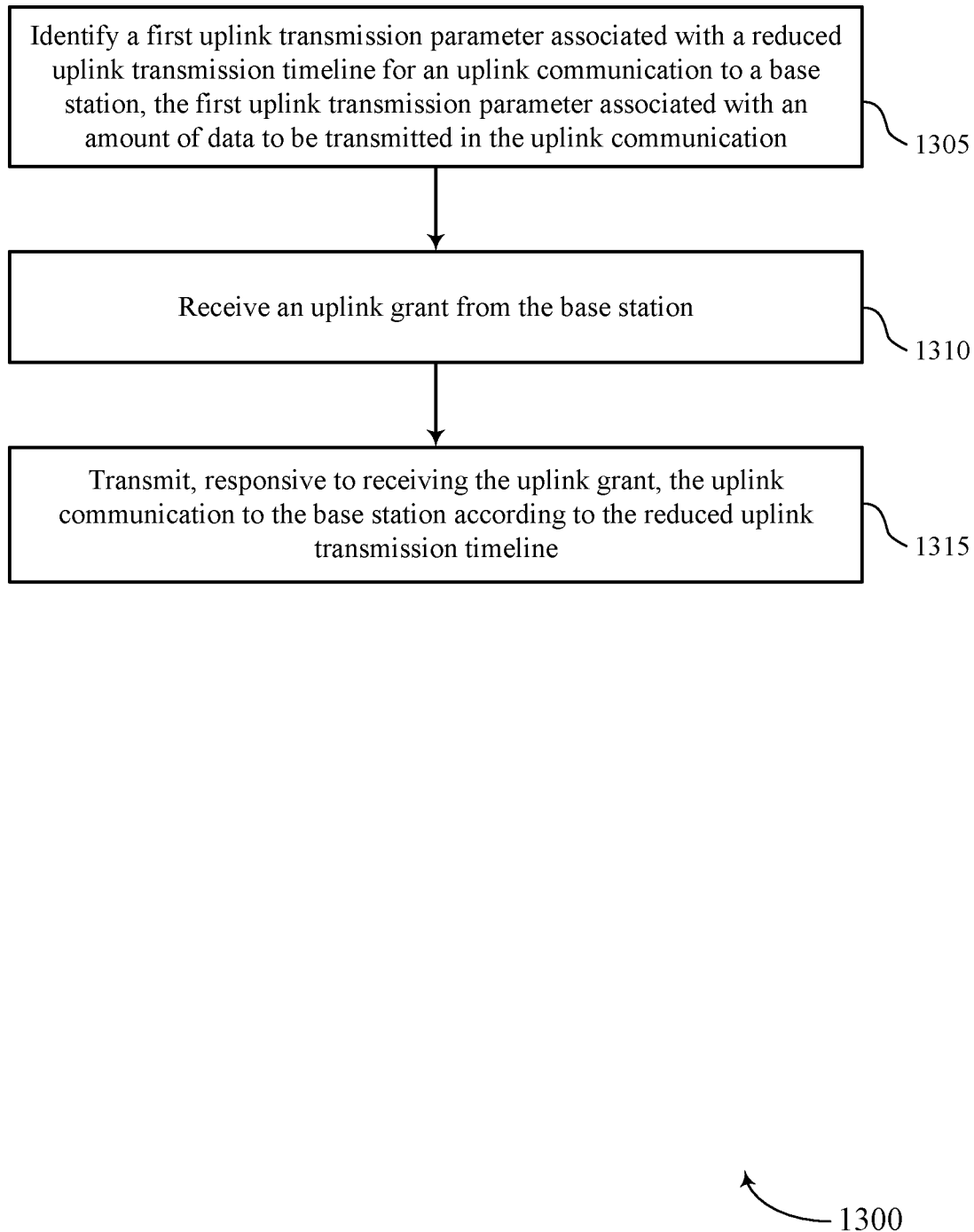
FIGS. 13 through 17 show flowcharts illustrating methods in accordance with aspects of the present disclosure.

FIG. 13 shows a flowchart illustrating a method 1300 in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1305, the UE may identify a first uplink transmission parameter associated with a reduced uplink transmission timeline for an uplink communication to a base station, the first uplink transmission parameter associated with an amount of data to be transmitted in the uplink communication. The operations of 1305 may be performed according to the methods described herein. In some examples, aspects of the operations of 1305 may be performed by an uplink transmission parameter component as described with reference to FIGS. 5 through 8. In some cases, the first uplink transmission parameter includes one or more of a TBS, a modulation order, a MCS, a FFT size, a PUSCH allocation size in terms of number of RBs of absolute bandwidth, a number of layers, or any combinations thereof.

In some cases, the transmission of the uplink communication uses a first FFT size or PUSCH allocation size that is less than a FFT size or PUSCH allocation size threshold value associated with a reduced uplink transmission timeline. In some cases, the FFT size or PUSCH allocation size threshold is based on one or more of a capability of the UE or a SCS associated with the uplink communication. In some cases, the FFT size or PUSCH allocation size threshold is defined per component carrier or across an uplink allocation across two or more component carriers. In some cases, the FFT size or PUSCH allocation size threshold is based on a service type associated with the uplink communication or an aggregated allocated bandwidth across two or more logical channels. In such cases, the uplink communication may be associated with one of the two or more logical channels. In some cases, the first uplink transmission parameter is known a priori at the UE, and packet preparation at one or more of a MAC layer or a RLC layer is initiated prior to the receiving the uplink grant.

At 1310, the UE may receive an uplink grant from the base station. The operations of 1310 may be performed according to the methods described herein. In some examples, aspects of the operations of 1310 may be performed by an uplink grant manager as described with reference to FIGS. 5 through 8.

At 1315, the UE may transmit, responsive to receiving the uplink grant, the uplink communication to the base station according to the reduced uplink transmission timeline. The operations of 1315 may be performed according to the methods described herein. In some examples, aspects of the operations of 1315 may be performed by an uplink grant manager as described with reference to FIGS. 5 through 8.

Figure 14:
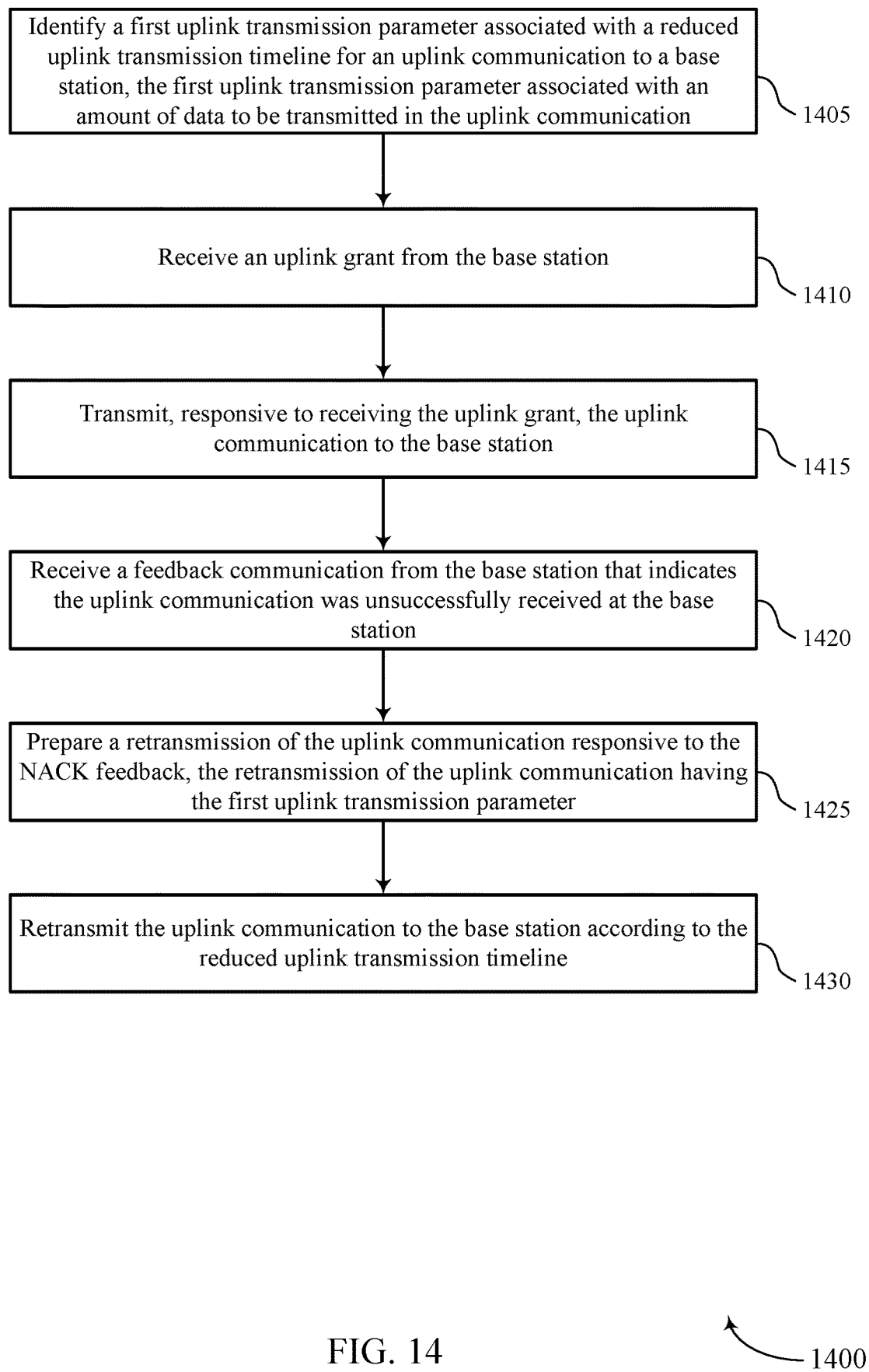

FIG. 14 shows a flowchart illustrating a method 1400 in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1405, the UE may identify a first uplink transmission parameter associated with a reduced uplink transmission timeline for an uplink communication to a base station, the first uplink transmission parameter associated with an amount of data to be transmitted in the uplink communication. The operations of 1405 may be performed according to the methods described herein. In some examples, aspects of the operations of 1405 may be performed by an uplink transmission parameter component as described with reference to FIGS. 5 through 8.

At 1410, the UE may receive an uplink grant from the base station. The operations of 1410 may be performed according to the methods described herein. In some examples, aspects of the operations of 1410 may be performed by an uplink grant manager as described with reference to FIGS. 5 through 8.

At 1415, the UE may transmit, responsive to receiving the uplink grant, the uplink communication to the base station. The operations of 1415 may be performed according to the methods described herein. In some examples, aspects of the operations of 1415 may be performed by an uplink grant manager as described with reference to FIGS. 5 through 8.

At 1420, the UE may receive a feedback communication from the base station that indicates the uplink communication was unsuccessfully received at the base station. The operations of 1420 may be performed according to the methods described herein. In some examples, aspects of the operations of 1420 may be performed by a HARQ component as described with reference to FIGS. 5 through 8.

At 1425, the UE may prepare a retransmission of the uplink communication responsive to the NACK feedback, the retransmission of the uplink communication having the first uplink transmission parameter. The operations of 1425 may be performed according to the methods described herein. In some examples, aspects of the operations of 1425 may be performed by an uplink processing manager as described with reference to FIGS. 5 through 8.

At 1430, the UE may retransmit the uplink communication to the base station according to the reduced uplink transmission timeline. The operations of 1430 may be performed according to the methods described herein. In some examples, aspects of the operations of 1430 may be performed by an uplink grant manager as described with reference to FIGS. 5 through 8. In some cases, the transmission and retransmission of the uplink communication are completed within a predetermined latency budget of 1 millisecond. In some cases, a first time period between receiving the uplink grant and transmitting the uplink communication is longer than a second time period between receiving the feedback and retransmitting the uplink communication. In some cases, the feedback is a NACK feedback or a retransmission grant from the base station.

Figure 15:
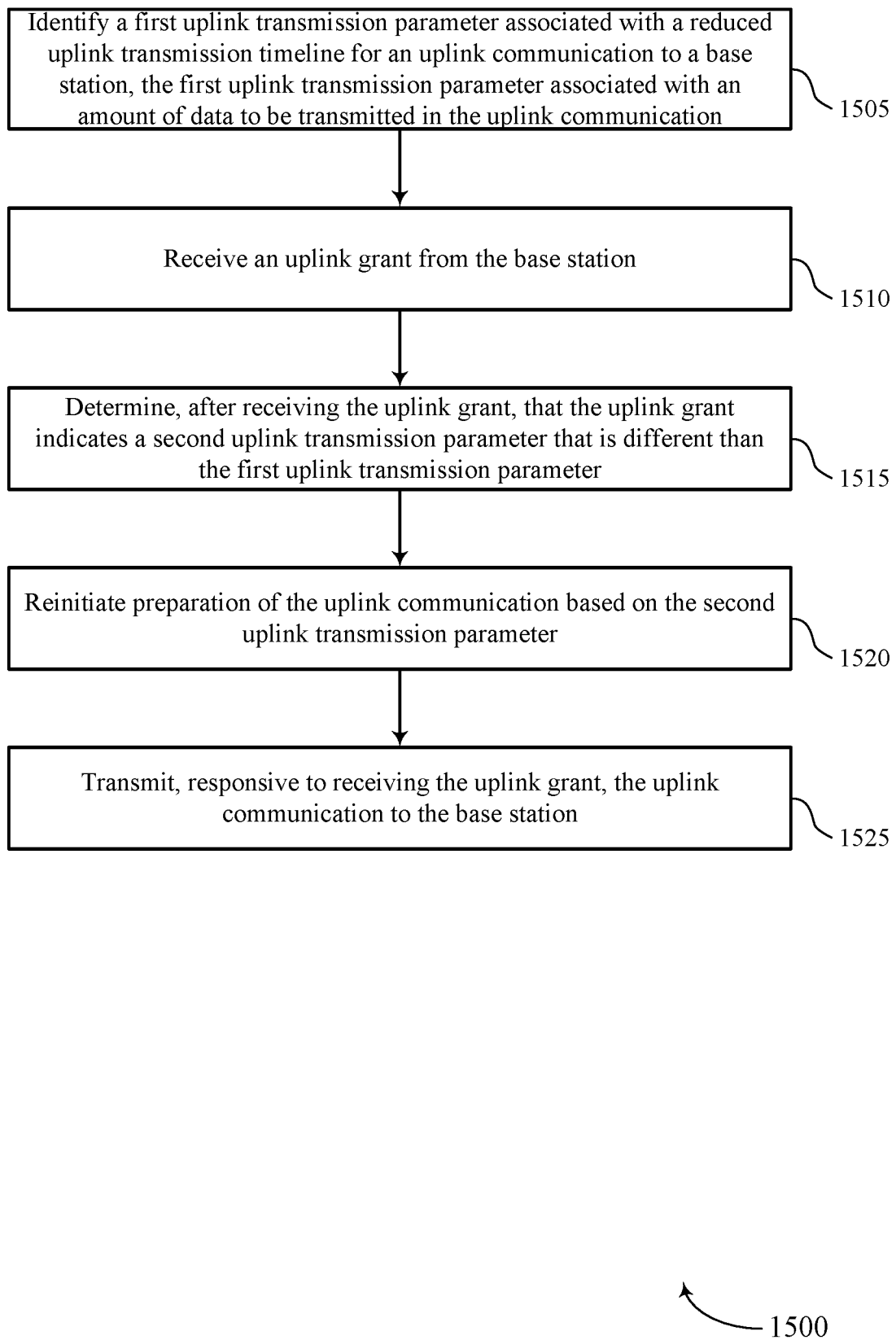

FIG. 15 shows a flowchart illustrating a method 1500 in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1505, the UE may identify a first uplink transmission parameter associated with a reduced uplink transmission timeline for an uplink communication to a base station, the first uplink transmission parameter associated with an amount of data to be transmitted in the uplink communication. The operations of 1505 may be performed according to the methods described herein. In some examples, aspects of the operations of 1505 may be performed by an uplink transmission parameter component as described with reference to FIGS. 5 through 8.

At 1510, the UE may receive an uplink grant from the base station. The operations of 1510 may be performed according to the methods described herein. In some examples, aspects of the operations of 1510 may be performed by an uplink grant manager as described with reference to FIGS. 5 through 8.

At 1515, the UE may determine, after receiving the uplink grant, that the uplink grant indicates a second uplink transmission parameter that is different than the first uplink transmission parameter. The operations of 1515 may be performed according to the methods described herein. In some examples, aspects of the operations of 1515 may be performed by an uplink transmission parameter component as described with reference to FIGS. 5 through 8.

At 1520, the UE may reinitiate preparation of the uplink communication based on the second uplink transmission parameter. The operations of 1520 may be performed according to the methods described herein. In some examples, aspects of the operations of 1520 may be performed by an uplink processing manager as described with reference to FIGS. 5 through 8.

At 1525, the UE may transmit, responsive to receiving the uplink grant, the uplink communication to the base station. The operations of 1525 may be performed according to the methods described herein. In some examples, aspects of the operations of 1525 may be performed by an uplink grant manager as described with reference to FIGS. 5 through 8. In some cases, the transmitting the uplink communication is based on the second uplink transmission parameter.

Figure 16:
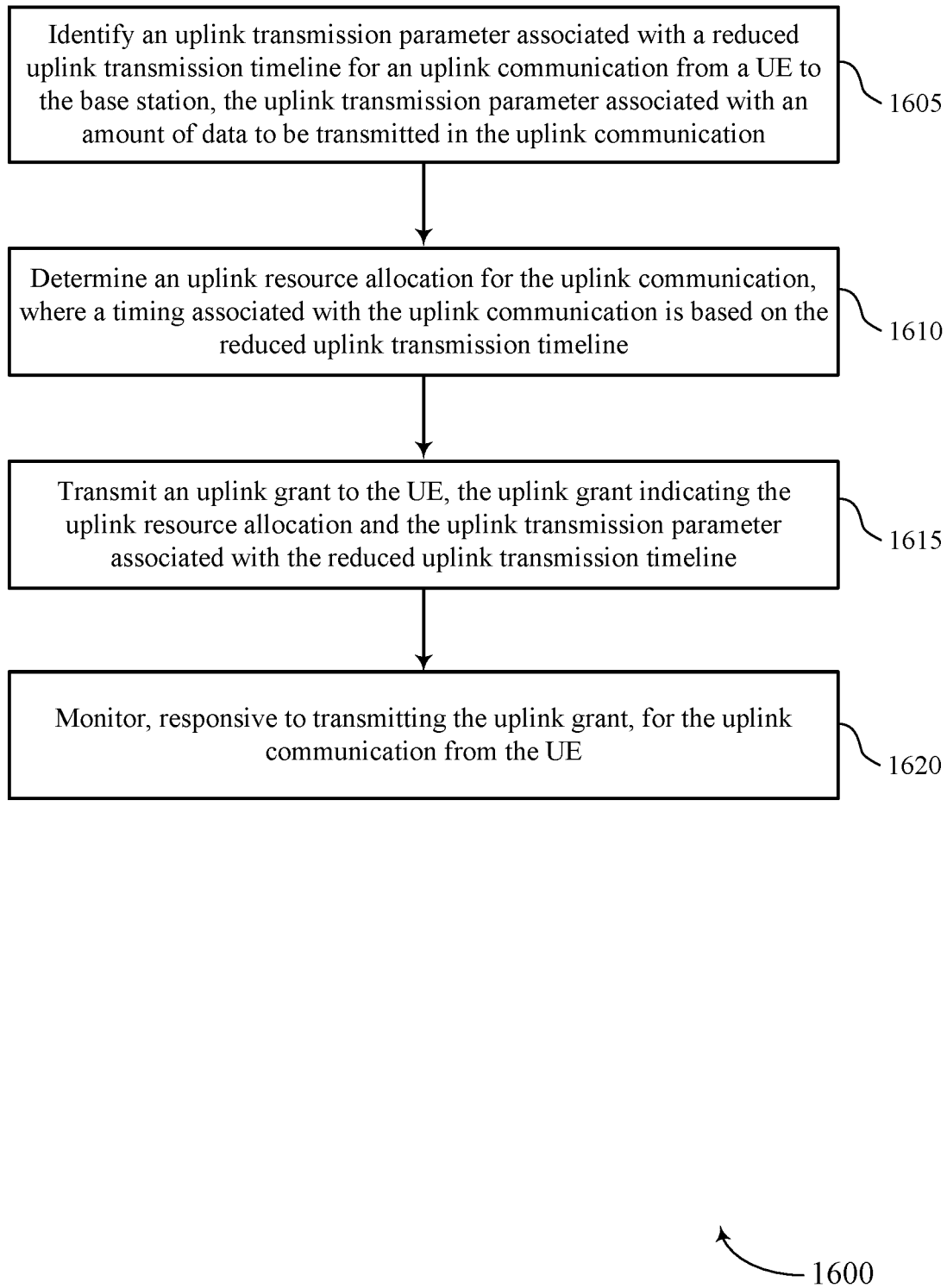

FIG. 16 shows a flowchart illustrating a method 1600 in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described herein. Additionally or alternatively, a base station may perform aspects of the functions described herein using special-purpose hardware.

At 1605, the base station may identify an uplink transmission parameter associated with a reduced uplink transmission timeline for an uplink communication from a UE to the base station, the uplink transmission parameter associated with an amount of data to be transmitted in the uplink communication. The operations of 1605 may be performed according to the methods described herein. In some examples, aspects of the operations of 1605 may be performed by an uplink transmission parameter component as described with reference to FIGS. 9 through 12.

At 1610, the base station may determine an uplink resource allocation for the uplink communication. The timing associated with the uplink communication may be based on the reduced uplink transmission timeline. The operations of 1610 may be performed according to the methods described herein. In some examples, aspects of the operations of 1610 may be performed by an uplink grant manager as described with reference to FIGS. 9 through 12.

At 1615, the base station may transmit an uplink grant to the UE that indicates the uplink resource allocation and the uplink transmission parameter associated with the reduced uplink transmission timeline. The operations of 1615 may be performed according to the methods described herein. In some examples, aspects of the operations of 1615 may be performed by an uplink grant manager as described with reference to FIGS. 9 through 12.

At 1620, the base station may monitor, responsive to transmitting the uplink grant, for the uplink communication from the UE. The operations of 1620 may be performed according to the methods described herein. In some examples, aspects of the operations of 1620 may be performed by an uplink communication manager as described with reference to FIGS. 9 through 12.

Figure 17:
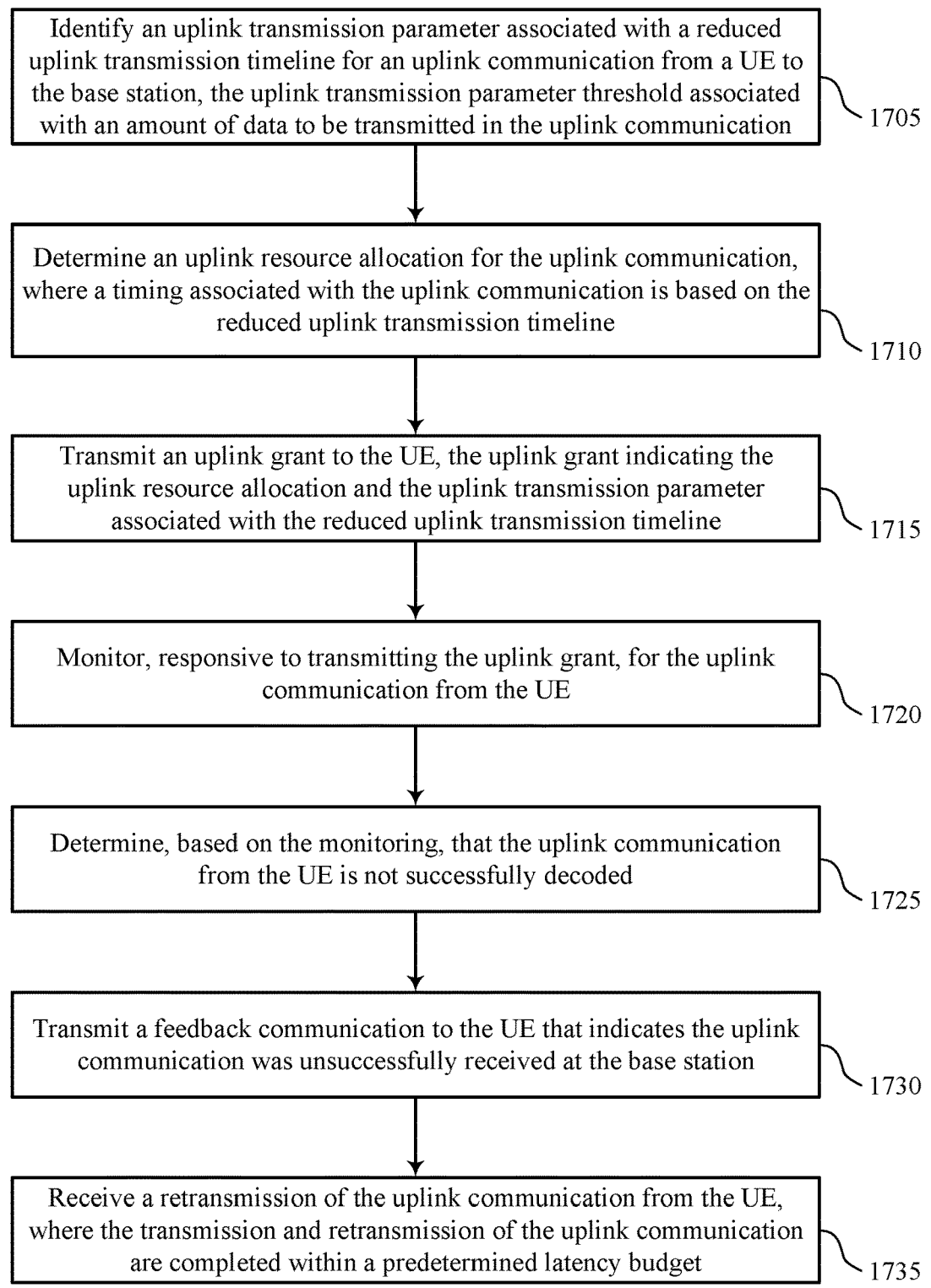

FIG. 17 shows a flowchart illustrating a method 1700 in accordance with aspects of the present disclosure. The operations of method 1700 may be implemented by a base station 105 or its components as described herein. For example, the operations of method 1700 may be performed by a communications manager as described with reference to FIGS. 9 through 12. In some examples, a base station may execute a set of instructions to control the functional elements of the base station to perform the functions described herein. Additionally or alternatively, a base station may perform aspects of the functions described herein using special-purpose hardware.

At 1705, the base station may identify an uplink transmission parameter associated with a reduced uplink transmission timeline for an uplink communication from a UE to the base station, the uplink transmission parameter associated with an amount of data to be transmitted in the uplink communication. The operations of 1705 may be performed according to the methods described herein. In some examples, aspects of the operations of 1705 may be performed by an uplink transmission parameter component as described with reference to FIGS. 9 through 12.

At 1710, the base station may determine an uplink resource allocation for the uplink communication. In some cases, a timing associated with the uplink communication is based on the reduced uplink transmission timeline. The operations of 1710 may be performed according to the methods described herein. In some examples, aspects of the operations of 1710 may be performed by an uplink grant manager as described with reference to FIGS. 9 through 12.

At 1715, the base station may transmit the uplink grant to the UE that indicates the uplink resource allocation and the uplink transmission parameter associated with the reduced uplink transmission timeline. The operations of 1715 may be performed according to the methods described herein. In some examples, aspects of the operations of 1715 may be performed by an uplink grant manager as described with reference to FIGS. 9 through 12.

At 1720, the base station may monitor, responsive to transmitting the uplink grant, for the uplink communication from the UE. The operations of 1720 may be performed according to the methods described herein. In some examples, aspects of the operations of 1720 may be performed by an uplink communication manager as described with reference to FIGS. 9 through 12.

At 1725, the base station may determine, based on the monitoring, that the uplink communication from the UE is not successfully decoded. The operations of 1725 may be performed according to the methods described herein. In some examples, aspects of the operations of 1725 may be performed by a decoding component as described with reference to FIGS. 9 through 12.

At 1730, the base station may transmit a feedback communication to the UE that indicates the uplink communication was unsuccessfully received at the base station. The operations of 1730 may be performed according to the methods described herein. In some examples, aspects of the operations of 1730 may be performed by a HARQ component as described with reference to FIGS. 9 through 12.

At 1735, the base station may receive a retransmission of the uplink communication from the UE, where the transmission and retransmission of the uplink communication are completed within a predetermined latency budget. The operations of 1735 may be performed according to the methods described herein. In some examples, aspects of the operations of 1735 may be performed by an uplink communication manager as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   identifying a first uplink transmission parameter for an uplink communication to a base station, the first uplink transmission parameter associated with an amount of data to be transmitted in the uplink communication;
   receiving an uplink retransmission grant from the base station, the uplink retransmission grant indicating a second uplink transmission parameter associated with a reduced uplink retransmission timeline; and
   transmitting, responsive to receiving the uplink retransmission grant, a retransmission of the uplink communication to the base station according to the reduced uplink retransmission timeline based at least in part on comparing the first uplink transmission parameter with the second uplink transmission parameter indicated in the uplink retransmission grant.

2. The method of claim 1, further comprising:
   receiving a feedback communication from the base station that indicates the uplink communication was unsuccessfully received at the base station; and
   preparing the retransmission of the uplink communication responsive to the feedback communication.

3. The method of claim 2, wherein transmission and the retransmission of the uplink communication are completed within a predetermined latency budget of 1 millisecond.

4. The method of claim 2, wherein transmission of the uplink communication uses a first transport block size (TBS), and the retransmission of the uplink communication uses the first TBS, and wherein the first TBS is less than a TBS threshold value associated with the reduced uplink retransmission timeline.

5. The method of claim 2, wherein transmission of the uplink communication uses a first modulation and coding scheme (MCS), and the retransmission of the uplink communication uses the first MCS.

6. The method of claim 2, wherein a first time period between receiving an uplink grant and transmitting the uplink communication is longer than a second time period between receiving the feedback communication and retransmitting the uplink communication.

7. The method of claim 6, wherein the feedback communication is a negative acknowledgment (NACK) feedback or the uplink retransmission grant from the base station.

8. The method of claim 1, wherein the first uplink transmission parameter comprises one or more of a transport block size (TBS), a modulation order, a modulation and coding scheme (MCS), a fast Fourier transform (FFT) size, a physical uplink shared channel (PUSCH) allocation size in terms of number of resource blocks (RBs) or absolute bandwidth, a number of layers, or any combinations thereof.

9. The method of claim 8, wherein transmission of the uplink communication uses a first FFT size or PUSCH allocation size that is less than a FFT size or PUSCH allocation size threshold value associated with the reduced uplink retransmission timeline.

10. The method of claim 9, wherein the FFT size or PUSCH allocation size threshold value is based at least in part on one or more of a capability of the UE or a subcarrier spacing (SCS) associated with the uplink communication.

11. The method of claim 9, wherein the FFT size or PUSCH allocation size threshold value is defined per component carrier or across an uplink allocation across two or more component carriers.

12. The method of claim 9, wherein the FFT size or PUSCH allocation size threshold value is based at least in part on a service type associated with the uplink communication or an aggregated allocated bandwidth across two or more logical channels, and wherein the uplink communication is associated with one of the two or more logical channels.

13. The method of claim 8, wherein the first uplink transmission parameter is known a priori at the UE, and packet preparation at one or more of a medium access control (MAC) layer or a radio link control (RLC) layer is initiated prior to the receiving the uplink retransmission grant.

14. The method of claim 1, further comprising:
determining, after comparing the first uplink transmission parameter with the second uplink transmission parameter, that the second uplink transmission parameter is different than the first uplink transmission parameter;
reinitiating preparation of the retransmission of the uplink communication based at least in part on the second uplink transmission parameter; and
wherein the transmitting the retransmission of the uplink communication is based on the second uplink transmission parameter.

15. The method of claim 14, further comprising:
determining that the second uplink transmission parameter exceeds a predetermined uplink transmission parameter threshold value.

16. The method of claim 15, wherein the predetermined uplink transmission parameter threshold value is based at least in part on one or more of a capability of the UE, a specified threshold value, a configuration provided by the base station, or a retransmission threshold.

17. The method of claim 1, wherein a first timing between the receiving the uplink retransmission grant and transmitting the retransmission of the uplink communication is reduced relative to a second timing associated with preparing the uplink communication after receiving an uplink grant.

18. A method for wireless communication at a base station, comprising:
identifying a first uplink transmission parameter for an uplink communication from a user equipment (UE) to the base station, the first uplink transmission parameter associated with an amount of data to be transmitted in the uplink communication;
determining an uplink resource allocation for a retransmission of the uplink communication and a second uplink transmission parameter, wherein a timing associated with the retransmission of the uplink communication is based at least in part on a reduced uplink retransmission timeline;
transmitting an uplink retransmission grant to the UE, the uplink retransmission grant indicating the uplink resource allocation and the second uplink transmission parameter; and
monitoring, responsive to transmitting the uplink retransmission grant, for the retransmission of the uplink communication from the UE according to the timing, based at least in part on comparing the first uplink transmission parameter with the second uplink transmission parameter indicated in the uplink retransmission grant.

19. The method of claim 18, further comprising:
determining, based at least in part on the monitoring, that the uplink communication from the UE is not successfully decoded;
transmitting a feedback communication to the UE that indicates the uplink communication was unsuccessfully received at the base station; and
receiving the retransmission of the uplink communication from the UE, wherein transmission and the retransmission of the uplink communication are completed within a predetermined latency budget.

20. The method of claim 19, wherein a first time period between transmitting an uplink grant and monitoring for the uplink communication is longer than a second time period between transmitting the feedback communication and receiving the retransmission of the uplink communication.

21. The method of claim 20, wherein the feedback communication is a negative acknowledgment (NACK) feedback or the uplink retransmission grant.

22. The method of claim 18, wherein the first uplink transmission parameter comprises one or more of a transport block size (TBS), a modulation order, a modulation and coding scheme (MCS), a fast Fourier transform (FFT) size, a physical uplink shared channel (PUSCH) allocation size in terms of number of resource blocks (RBs) or absolute bandwidth, a number of layers, or any combinations thereof.

23. The method of claim 22, wherein the uplink communication uses a first FFT size or PUSCH allocation size that is less than a FFT size or PUSCH allocation size threshold value associated with the reduced uplink retransmission timeline.

24. The method of claim 23, wherein the FFT size or PUSCH allocation size threshold value is based at least in part on one or more of a capability of the UE or a subcarrier spacing (SCS) associated with the uplink communication.

25. The method of claim 23, wherein the FFT size or PUSCH allocation size threshold value is defined per component carrier or across the uplink resource allocation across two or more component carriers.

26. The method of claim 23, wherein the FFT size or PUSCH allocation size threshold value is based at least in part on a service type associated with the uplink communication or an aggregated allocated bandwidth across two or more logical channels, and wherein the uplink communication is associated with one of the two or more logical channels.

27. The method of claim 22, wherein the uplink communication uses a first transport block size (TBS), and the retransmission of the uplink communication uses the first TBS, and wherein the first TBS is less than a TBS threshold value associated with the reduced uplink retransmission timeline.

28. The method of claim 18, wherein the uplink communication uses a first modulation and coding scheme (MCS), and the retransmission of the uplink communication uses the first MCS.

29. An apparatus for wireless communication at a user equipment (UE), comprising:
a processor,
memory coupled with the processor; and
instructions stored in the memory and executable by the processor to cause the apparatus to:
identify a first uplink transmission parameter for an uplink communication to a base station, the first uplink transmission parameter associated with an amount of data to be transmitted in the uplink communication;
receive an uplink retransmission grant from the base station, the uplink retransmission grant indicating a second uplink transmission parameter associated with a reduced uplink retransmission timeline; and
transmit, responsive to receiving the uplink retransmission grant, a retransmission of the uplink communication to the base station according to the reduced uplink retransmission timeline based at least in part on comparing the first uplink transmission parameter with the second uplink transmission parameter indicated in the uplink retransmission grant.

30. An apparatus for wireless communication at a base station, comprising:
a processor,
memory coupled with the processor; and
instructions stored in the memory and executable by the processor to cause the apparatus to:
identify a first uplink transmission parameter for an uplink communication from a user equipment (UE) to the base station, the first uplink transmission parameter associated with an amount of data to be transmitted in the uplink communication;
determine an uplink resource allocation for a retransmission of the uplink communication and a second uplink transmission parameter, wherein a timing associated with the retransmission of the uplink communication is based at least in part on a reduced uplink retransmission timeline;
transmit an uplink retransmission grant to the UE, the uplink retransmission grant indicating the uplink resource allocation and the second uplink transmission parameter; and
monitor, responsive to transmitting the uplink retransmission grant, for the retransmission of the uplink communication from the UE according to the timing, based at least in part on comparing the first uplink transmission parameter with the second uplink transmission parameter indicated in the uplink retransmission grant.

* * * * *